US012316927B2

(12) United States Patent
McGuire et al.

(10) Patent No.: US 12,316,927 B2
(45) Date of Patent: *May 27, 2025

(54) BEHIND THE WINDSHIELD CAMERA-BASED PERCEPTION SYSTEM FOR AUTONOMOUS TRAFFIC VIOLATION DETECTION

(71) Applicant: Hayden AI Technologies, Inc., Oakland, CA (US)

(72) Inventors: Patrick L. McGuire, Oakland, CA (US); Ahmad Lemar, Union City, CA (US); Randal B. Chinnock, Ashford, CT (US); Joseph Virzi, Fremont, CA (US); Vaibhav Ghadiok, Mountain View, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,737

(22) Filed: May 9, 2023

(65) Prior Publication Data

US 2024/0163533 A1   May 16, 2024

Related U.S. Application Data

(62) Division of application No. 18/068,721, filed on Dec. 20, 2022, now Pat. No. 11,689,787.

(Continued)

(51) Int. Cl.
*H04N 23/11* (2023.01)
*B60R 11/04* (2006.01)
(Continued)

(52) U.S. Cl.
CPC .............. *H04N 23/11* (2023.01); *B60R 11/04* (2013.01); *H04N 7/181* (2013.01); *H04N 23/51* (2023.01);
(Continued)

(58) Field of Classification Search
CPC ........ H04N 23/11; H04N 23/51; H04N 23/54; H04N 23/56; H04N 23/90; H04N 7/181; B60R 11/04
(Continued)

(56) References Cited

U.S. PATENT DOCUMENTS 6,741,405 B1 * 5/2004 Chen ...................... H04N 23/55
359/813
9,070,289 B2   6/2015 Saund et al.
(Continued)

FOREIGN PATENT DOCUMENTS

CN         2277104       3/1998
CN       106560861       4/2017
(Continued)

OTHER PUBLICATIONS

"Consulting services in Computer Vision and AI" accessed on May 8, 2023, online.
(Continued)

*Primary Examiner* — Matthew David Kim
(74) *Attorney, Agent, or Firm* — Chang & Hale LLP

(57) ABSTRACT

Disclosed herein are systems and apparatus for detecting a traffic violation. In one embodiment, a system for detecting a traffic violation comprises a context camera assembly and a license plate recognition (LPR) camera assembly. The context camera assembly can comprise a context camera housing containing a context camera, a context camera mount configured to mount the context camera housing to an interior of a carrier vehicle, and a context camera skirt coupled to and protruding outwardly from the context camera housing. The license LPR camera assembly can comprise an LPR camera housing containing one or more LPR cameras, an LPR camera mount configured to mount the LPR camera housing to the interior of the carrier vehicle, (Continued)

and one or more LPR camera skirts coupled to and protruding outwardly from the LPR camera housing.

17 Claims, 15 Drawing Sheets

Related U.S. Application Data

(60) Provisional application No. 63/383,958, filed on Nov. 16, 2022.

(51) Int. Cl.
| | | |
|---|---|---|
| *H04N 7/18* | (2006.01) | |
| *H04N 23/51* | (2023.01) | |
| *H04N 23/54* | (2023.01) | |
| *H04N 23/56* | (2023.01) | |
| *H04N 23/90* | (2023.01) | |
| *B60R 11/00* | (2006.01) | |
| *G02B 5/20* | (2006.01) | |

(52) U.S. Cl.
CPC ............. *H04N 23/54* (2023.01); *H04N 23/56* (2023.01); *H04N 23/90* (2023.01); *B60R 2011/0026* (2013.01); *G02B 5/208* (2013.01)

(58) Field of Classification Search
USPC ........................................................ 348/148
See application file for complete search history.

(56) References Cited

U.S. PATENT DOCUMENTS

| | | | |
|---|---|---|---|
| 10,296,794 B2 | 5/2019 | Ratti | |
| 10,726,274 B1 | 7/2020 | Hasegawa et al. | |
| 11,003,919 B1 | 5/2021 | Ghadiok et al. | |
| 11,164,014 B1 | 11/2021 | Ghadiok et al. | |
| 11,322,017 B1 | 5/2022 | Ghadiok et al. | |
| 11,361,558 B2 | 6/2022 | Seo | |
| 11,688,182 B2 | 6/2023 | Ghadiok et al. | |
| 11,689,787 B1 | 6/2023 | McGuire et al. | |
| 2002/0072847 A1 | 6/2002 | Trajkovic et al. | |
| 2005/0035926 A1* | 2/2005 | Takenaga ............... B60S 1/0818 345/8 |
| 2010/0081200 A1 | 4/2010 | Rajala et al. | |
| 2010/0253832 A1* | 10/2010 | Duparre ................. H10F 39/804 348/360 |
| 2012/0148092 A1 | 6/2012 | Ni et al. | |
| 2012/0212617 A1* | 8/2012 | Wang .................... G08G 1/0175 348/149 |
| 2012/0242786 A1* | 9/2012 | Sasagawa ............... G03B 37/04 348/E5.026 |
| 2013/0266188 A1 | 10/2013 | Bulan et al. | |
| 2014/0007762 A1 | 1/2014 | Gavish et al. | |
| 2014/0036076 A1 | 2/2014 | Nerayoff et al. | |
| 2014/0160283 A1* | 6/2014 | Hofman ................ G06V 10/147 348/143 |
| 2014/0300738 A1* | 10/2014 | Mueller .................. G03B 29/00 348/148 |
| 2014/0311456 A1 | 10/2014 | Richter et al. | |
| 2015/0025800 A1* | 1/2015 | An ........................ G06V 20/588 701/523 |
| 2015/0042804 A1* | 2/2015 | Okuda .................... B60R 11/04 348/148 |
| 2015/0248595 A1 | 9/2015 | Khan et al. | |
| 2016/0232410 A1* | 8/2016 | Kelly .................... G06V 30/224 |
| 2017/0291548 A1* | 10/2017 | Kim ...................... H04N 13/296 |
| 2018/0172454 A1 | 6/2018 | Ghadiok et al. | |
| 2018/0240336 A1 | 8/2018 | Kareev et al. | |
| 2018/0242404 A1* | 8/2018 | Wehninck ................ H05B 3/34 |
| 2019/0137280 A1 | 5/2019 | Ghadiok et al. | |
| 2019/0197369 A1 | 6/2019 | Law et al. | |
| 2020/0063866 A1 | 2/2020 | Reinhart et al. | |
| 2020/0177767 A1 | 6/2020 | Kelly et al. | |
| 2020/0204713 A1* | 6/2020 | Potter ..................... H04N 23/51 |
| 2020/0247330 A1* | 8/2020 | Tokunaga ............... G03B 17/55 |
| 2020/0272032 A1* | 8/2020 | Takenouchi ......... G03B 17/561 |
| 2020/0326777 A1* | 10/2020 | Shoushtari ......... G02B 27/0093 |
| 2020/0380270 A1 | 12/2020 | Cox et al. | |
| 2021/0166145 A1 | 6/2021 | Omari et al. | |
| 2021/0209941 A1 | 7/2021 | Maheshwari et al. | |
| 2021/0237737 A1 | 8/2021 | Al-Nuaimi et al. | |
| 2021/0241003 A1 | 8/2021 | Seo | |
| 2021/0306537 A1* | 9/2021 | Solar ...................... H04N 23/57 |
| 2021/0370846 A1* | 12/2021 | Jo .............................. H05B 3/84 |
| 2022/0147745 A1 | 5/2022 | Ghadiok et al. | |

FOREIGN PATENT DOCUMENTS

| | | |
|---|---|---|
| CN | 110197589 | 9/2019 |
| CN | 110321823 | 10/2019 |
| CN | 110717433 | 1/2020 |
| CN | 111368687 | 7/2020 |
| CN | 111492416 | 8/2020 |
| CN | 111666853 | 9/2020 |
| JP | 4805763 | 3/2008 |
| KR | 100812397 | 3/2008 |
| WO | WO 2010/081200 | 7/2010 |
| WO | WO 2014/007762 | 1/2014 |
| WO | WO 2020/063866 | 4/2020 |
| WO | WO 2020/177767 | 9/2020 |
| WO | WO 2022/099237 | 5/2022 |
| WO | WO 2024/107471 | 5/2024 |

OTHER PUBLICATIONS

"Safety Vision Announces Smart Automated Bus Lane Enforcement (SABLETM) Solution," *Safety Vision*, Oct. 11, 2022, online.
Bo, T. et al., "Common Phase Error Estimation in Coherent Optical OFDM Systems Using Best-fit Bounding Box," *Optics Express*, vol. 24, No. 21, pp. 73707-23718, Oct. 2016.
Bo, T. et al., "Common Phase Estimation in Coherent OFDM System Using Image Processing Technique," *IEEE Photonics Technology Letters*, vol. 27, No. 15, Aug. 2015.
Bo, T. et al., "Image Processing Based Common Phase Estimation for Coherent Optical Orthogonal Frequency Division Multiplexing System," *Optical Fiber Communication Conference*, Mar. 2015.
Canizo, M. et al. "Multi-Head CNN-RNN for multi time series anomaly detection: An industrial case study," *Neurocomputing*, 363(21), pp. 246-260, Oct. 21, 2019.
Chen, S. et al., "A Dense Feature Pyramid Network-Based Deep Learning Model for Road Marking Instance Segmentation Using MLS Point Clouds," *EEE Transactions on GeoScience and Remote Sensing*, vol. 59, No. 1, pp. 784-800, Jan. 2021.
Chhaya, S. et al., "Basic Geometric Shape and Primary Colour Detection Using Image Processing On MATLAB," *IJRET: International Journal of Research in Engineering and Technology*, vol. 04, Issue 05, May 2015.
Clearlane, "Automated Bus Lane Enforcement System", *SafeFleet*, 2021, online.
Clearlane, "The Safe Fleet Automated Bus Lane Enforcement (ABLE)", *SafeFleet*, 2021, online.
Evanko, K. "Siemens Mobility launches first-ever mobile bus lane enforcement solution in New York," *Siemens Mobility*, Dec. 17, 2019, Munich, Germany.
Fan, Y. et al., "A Coarse-to-Fine Framework for Multiple Pedestrian Crossing Detection," *Sensors*, vol. 20, Jul. 2020.
Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.
Github Repository, Our Camera, <https://github.com/Bellspringsteen/OurCamera> (last visited Sep. 25, 2023).
Glenn, J., Adaptive Morphological Feature-Based Object Classifier for a Color Imaging System, *NASA Tech Briefs*, pp. 23-24, Dec. 2009.
Hsu, K., et al. "Augmented Multiple Instance Regression for Inferring Object Contours in Bounding Boxes," *IEEE Transaction on Image Processing*, vol. 23, No. 4, Apr. 2014.

(56) References Cited

OTHER PUBLICATIONS

Huval, B. et al. "An Empirical Evaluation of Deep Learning on Highway Driving," *Stanford University*, pp. 1-7 accessed on Apr. 17, 2015, online.

Liu, X. "Vehicle-Related Scene Understanding Using Deep Learning," *School of Engineering, Computer and Mathematical Sciences, Auckland University of Technology*, 2019, online.

Nehemiah, A et al. "Deep Learning for Automated Driving with MATLAB," *NVIDIA Technical Blog*, <https://developer.nvidia.com/blog/deep-learning-automated-driving-matlab/> accessed on Jun. 4, 2023, online.

Novak, L., "Vehicle Detection and Pose Estimation for Autonomous Driving," Prague, May 2017.

Oh, J. et al., "Context-based Abnormal Object Detection Using the Fully-connected Conditional Random Fields," *Pattern Recognition Letters 98*, pp. 16-25, Aug. 2017.

Paquet, E. et al., "Description of shape information for 2-D and 3-D objects," *Signal Processing: Image Communication 16*, pp. 103-122, Sep. 2000.

Safe Fleet. "Whitepaper: Vendor Interoperability for ABLE," *Safe Fleet*, pp. 1-6, Apr. 2023, online.

Sengupta, S., "Semantic Mapping of Road Scenes," Oxford Brookes University, Oct. 2014.

Siemens Mobility Inc., "Ratification of Completed Procurement Actions" New York City Transit and Siemens Mobility Inc., *Finance Committee Meeting*, pp. 80-81, Mar. 2019.

Siemens Mobility Traffic Solutions, "Enforcement Solutions For Safe and Efficient Cities," *Civil Enforcement*, 2016.

Spencer, B. et al. "NYC extends Brooklyn bus lane enforcement," *ITS International*, Feb. 27, 2020, online.

Sullivan, T. "Transit Bus Surveillance Solutions," *New York City Transit/MTA Bus*, Jun. 21, 2019, Charlotte, North Carolina, USA.

Tonge, A. et al., "Traffic Rules Violation Detection using Deep Learning," *2020 4th International Conference on Electronics, Communication and Aerospace Technology (ICECA)*, pp. 1250-1257, Nov. 2020, Coimbatore, India.

Viorel, C., "Some Aspects Concerning Geometric Forms Automatically Find Images and Ordering Them Using Robot Studio Simulation," *Advanced Materials Research*, vol. 1036, pp. 760-763, Oct. 1, 2014.

Wu, C. et al. "Adjacent Lane Detection and Lateral Vehicle Distance Measurement Using Vision-Based Neuro-Fuzzy Approaches," *Journal of Applied Research and Technology*, vol. 11, pp. 251-258, Apr. 2013.

Zhao Z. et al., "Deep Reinforcement Learning Based Lane Detection and Localization," *Nerocomputing*, vol. 413, pp. 328-338, Jul. 2020.

Zhou, C. et al., "Predicting the Passenger Demand on Bus Services for Mobile Users," *Pervasive and Mobile Computing 25*, pp. 48-66, Jan. 2016.

\* cited by examiner

CARRIER VEHICLE 128

MUNICIPAL FLEET VEHICLE

SEMI-AUTONOMOUS VEHICLE

AUTONOMOUS VEHICLE

BEHIND THE WINDSHIELD CAMERA-BASED PERCEPTION SYSTEM FOR AUTONOMOUS TRAFFIC VIOLATION DETECTION

CROSS-REFERENCE TO RELATED APPLICATION

This application is a divisional of U.S. patent application Ser. No. 18/068,721 filed on Dec. 12, 2022, which claims the benefit of U.S. Provisional Patent Application No. 63/383, 958 filed on Nov. 16, 2022, the contents of which are incorporated herein by reference in their entireties.

TECHNICAL FIELD

This disclosure relates generally to the field of computer-based traffic violation detection, more specifically, to a camera-based perception system for placement behind the windshield of a vehicle and for use in autonomous traffic violation detection.

BACKGROUND

Non-public vehicles parking in bus lanes or bike lanes is a significant transportation problem for municipalities, counties, and other government entities. While some cities have put in place initiatives aimed at improving bus speeds, enforcement of bus lane violations is often lacking and the reliability of multiple buses can be affected by just one vehicle illegally parked or temporarily stopped in a bus lane. Such disruptions in bus schedules can frustrate those that depend on public transportation and result in decreased ridership. On the contrary, as buses speed up due to bus lanes remaining unobstructed, reliability improves, leading to increased ridership, less congestion on city streets, and less pollution overall.

Similarly, vehicles parked illegally in bike lanes can force bicyclists to ride on the road, making their rides more dangerous and discouraging the use of bicycles as a safe and reliable mode of transportation. Moreover, vehicles parked along curbs or lanes designated as no parking zones or during times when parking is forbidden can disrupt crucial municipal services such as street sweeping, waste collection, and firefighting operations.

Traditional traffic enforcement technology and approaches are often not suited for lane enforcement purposes. For example, most traffic enforcement cameras are set up near crosswalks or intersections and are not suitable for enforcing lane violations beyond the cameras' fixed field of view. While some municipalities have deployed automated camera-based solutions to enforce traffic violations beyond intersections and cross-walks, such solutions are often logic-based and can result in detections with up to 80% false positive detection rate. Moreover, municipalities often do not have the financial means to dedicate specialized personnel to enforce lane violations.

One solution proposed for addressing the challenges faced by traditional traffic enforcement systems is to install or mount camera systems designed for traffic violation detection in moving vehicles such as municipal fleet vehicles (e.g., city buses, garbage trucks, etc.). However, installation of such camera systems on the exterior of municipal fleet vehicles is often onerous and cost-prohibitive due to municipal regulations governing changes to the exteriors of such vehicles.

Therefore, installation of such camera systems is often limited to the interior of such municipal fleet vehicles. Moreover, installing such camera systems in the interior of municipal fleet vehicles has the added benefit of protecting the high-tech equipment making up such systems from the elements (e.g., wind, rain, snow, etc.).

Nevertheless, even when such camera systems are installed in the interior of a vehicle, the interior environment may supply additional challenges that are not faced by an exterior installation. One such challenge is that the windshield of a vehicle is often designed to block certain light spectrums, including infrared (IR) light. This can be a problem when a camera system is designed to operate at night and IR lights must be used to illuminate the camera's field of view when the external environment is dark. For example, a typical municipal bus windshield can block up to 50% to 80% of IR light emitted from an IR light source. Another challenge is that the windshield of a vehicle can also reflect both unwanted ambient light and IR light. These reflections can cause problems for the camera system. This challenge is more pronounced in fleet vehicles that carry passengers (e.g., buses) where the interiors of such fleet vehicles are often lit by copious amounts of interior lighting.

Yet another challenge is that IR lights often generate an excessive amount of heat, which can result in such lights becoming inoperable when used for a long period of time. Furthermore, such camera systems can only be installed in a limited number of locations within the fleet vehicle in order to avoid blocking the driver's field of view and in order to avoid being blocked by moveable objects such as a vehicle's windshield wipers. Moreover, such camera systems often require scrupulous calibration concerning the positioning of the cameras after the system is installed in a vehicle.

Therefore, an improved traffic-violation detection camera system is needed that can be installed within the interior of a vehicle and that can overcome the abovementioned challenges. Such a system should be accurate and not overly complicated. Moreover, such a solution should improve traffic safety and enable transportation efficiency. Furthermore, such a solution should be scalable and reliable and not be overly expensive to deploy.

SUMMARY

A camera-based system for placement behind the windshield of a carrier vehicle for use in autonomous traffic violation detection is disclosed. Also disclosed are certain camera assemblies making up the system.

In some embodiments, the system can comprise a context camera assembly, a license plate recognition (LPR) camera assembly, and a control unit. The context camera assembly can comprise a context camera housing containing a context camera configured to capture videos of a traffic violation event, a context camera mount coupled to the context camera housing and configured to mount the context camera housing to an interior of a carrier vehicle, a context camera skirt coupled to and protruding outwardly from the context camera housing, wherein the context camera skirt can be configured to block unwanted ambient light. The LPR camera assembly can comprise an LPR camera housing containing one or more LPR cameras configured to capture videos containing one or more license plates of one or more vehicles involved in the traffic violation event, an LPR camera mount coupled to the LPR camera housing and configured to mount the LPR camera housing to the interior of the carrier vehicle at an angle with respect to a windshield of the carrier vehicle, at least one LPR camera skirt coupled to and protruding outwardly from the LPR camera housing, wherein the at least one LPR camera skirt can be configured to block unwanted ambient light. The control unit can be communicatively coupled to the context camera and the one or more LPR cameras and be configured to receive videos captured by at least one of the context camera and the one or more LPR cameras and transmit the videos wirelessly to another device.

In some embodiments, the LPR camera assembly further comprises a daytime LPR camera and a nighttime LPR camera.

In some embodiments, the nighttime LPR camera can be an infrared (IR) camera or a near-infrared (NIR) camera. In certain embodiments, the LPR camera assembly further comprises a plurality of infrared (IR) lights or NIR lights to illuminate an event scene.

For purposes of this disclosure, any reference to infrared light(s), IR light(s), IR light-emitting diodes (LEDs), or an IR camera can also be considered a reference to near-infrared light(s), NIR light(s), NIR LEDs, or an NIR camera, respectively.

In some embodiments, the plurality of IR lights can be arranged to surround or partially surround the nighttime LPR camera.

In some embodiments, the plurality of IR lights are configured can be arranged as an IR light array.

In some embodiments, the LPR camera assembly can further comprise an inner camera skirt to block IR light reflected from a windshield of the carrier vehicle.

In some embodiments, the inner camera skirt can comprise a first inner camera skirt lateral side and a second inner camera skirt lateral side, and wherein a length of the first inner camera skirt lateral side is not the same as the length of the second inner camera skirt lateral side.

In some embodiments, the emission of IR light by the plurality of IR lights can be synchronized with a rate with which the nighttime LPR camera captures video frames or images.

In some embodiments, the plurality of IR lights can be periodically powered off to avoid overheating.

In some embodiments, the LPR camera assembly can comprise an LPR camera housing containing one or more LPR cameras configured to capture videos containing license plates of vehicles involved in a traffic violation event; an LPR camera mount coupled to the LPR camera housing and configured to mount the LPR camera housing to the interior of a carrier vehicle at an angle with respect to a windshield of the carrier vehicle, a plurality of infrared (IR) lights configured to illuminate an event scene of the traffic violation event, and at least one LPR camera skirt coupled to and protruding outwardly from the LPR camera housing, wherein the at least one LPR camera skirt can be configured to block unwanted ambient light and prevent reflected IR light from interfering with the videos captured by the one or more LPR cameras.

In some embodiments, the one or more LPR cameras can comprise a daytime LPR camera configured to capture videos in a visible spectrum and a nighttime LPR camera configured to capture videos in the IR or near-infrared (NIR) spectrum.

In some embodiments, the plurality of IR lights can be arranged in an array.

In some embodiments, the plurality of IR lights can be arranged to surround or partially surround at least one of the LPR cameras.

In some embodiments, the at least one LPR camera skirt can comprise an outer LPR camera skirt and an inner LPR camera skirt at least partially shrouded or surrounded by the outer LPR camera skirt.

In some embodiments, the outer LPR camera skirt can comprise a first outer camera skirt lateral side and a second outer camera skirt lateral side, and wherein a length of the first outer camera skirt lateral side can be greater than the length of the second outer camera skirt lateral side.

In some embodiments, the inner LPR camera skirt can comprise a first inner camera skirt lateral side and a second inner camera skirt lateral side, and wherein a length of the first inner camera skirt lateral side can be greater than the length of the second inner camera skirt lateral side.

In some embodiments, the length of the first inner camera skirt lateral side can be less than the length of the first outer camera skirt lateral side.

In some embodiments, the length of at least one of the second inner camera skirt lateral side and the first inner camera skirt lateral side can be determined based on an angle defined by the second outer camera skirt lateral side and a windshield of the carrier vehicle.

In some embodiments, an IR bandpass filter can cover the plurality of IR lights.

In some embodiments, an IR blocking filter can cover at least part of the daytime LPR camera.

In some embodiments, the LPR camera mount can be configured to mount the LPR camera housing to a ceiling or headliner of the carrier vehicle.

In some embodiments, the LPR camera mount can be configured to mount the LPR camera housing such that a distal skirt edge of the at least one LPR camera skirt is positioned less than 3.0 cm from a windshield of the carrier vehicle but does not physically contact the windshield of the carrier vehicle.

In some embodiments, the at least one LPR camera skirt can have a skirt thickness of between 2.00 mm and 2.50 mm.

In some embodiments, the LPR camera assembly, comprises: an LPR camera configured to capture videos containing license plates of vehicles involved in a traffic violation event; a plurality of infrared (IR) light emitting diodes (LEDs) configured to illuminate an event scene of the traffic violation event; and a control circuit operably coupled to a power source and the plurality of IR LEDs, wherein the control circuit comprises: an energy storage capacitor, a current limiter configured to limit a charging current delivered to the capacitor, and a bipolar junction transistor connected in series between at least one of the IR LEDs and a resistor; wherein the capacitor can be configured to discharge when a camera frame capture pulse arrives; wherein the camera frame capture pulse can be timed to arrive in accordance with a camera frame rate of the LPR camera; wherein current flows through the plurality of IR LEDs and the resistor into a current sink once the capacitor is discharged; wherein once the camera frame capture pulse passes, the bipolar junction transistor is disconnected, the plurality of IR LEDs are turned off, and the capacitor begins to recharge.

In some embodiments, the bipolar junction transistor can be an NPN bipolar junction transistor.

In some embodiments, each of the IR LEDs can be connected in parallel with the capacitor.

In some embodiments, the plurality of IR LEDs can comprise two strings of multiple IR LEDs connected in series. Each of the two strings of IR LEDs can be connected in parallel with the capacitor.

In some embodiments, the plurality of IR LEDs can be turned off until the arrival of a subsequent camera frame capture pulse.

In some embodiments, the LPR camera can be a camera configured to capture videos in the IR or near-infrared (NIR) spectrum.

DETAILED DESCRIPTION

Figure 1A:
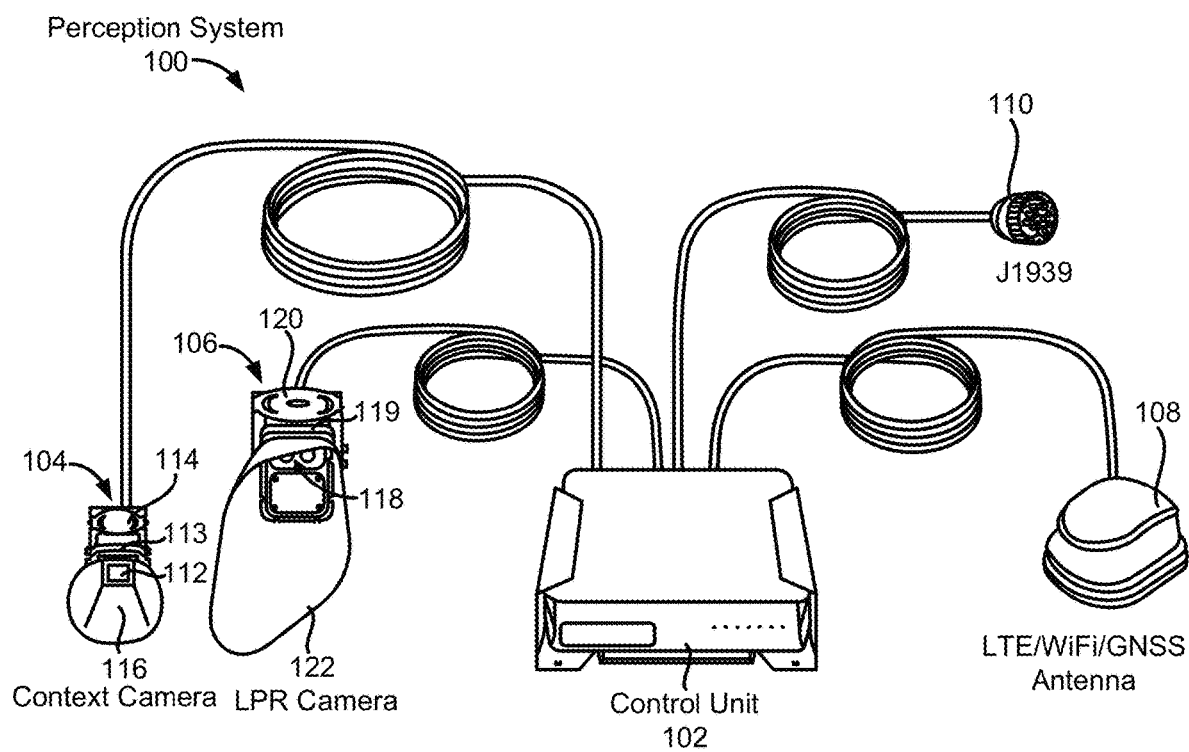
FIG. 1A illustrates one embodiment of a camera-based perception system for use in autonomous traffic violation detection.

FIG. 1A illustrates one embodiment of a camera-based perception system 100 for use in autonomous traffic violation detection. The system 100 is configured for placement behind a windshield 402 of a carrier vehicle 128 (e.g., a fleet vehicle, see FIGS. 1C, 4A, 4B, 5B, and 5C). The system 100 can comprise a control unit 102, a context camera assembly 104 communicatively coupled to the control unit 102, and a license plate recognition (LPR) camera assembly 106 communicatively coupled to the control unit 102. The system 100 can further comprise a communication and positioning unit 108 and a vehicle bus connector 110.

The control unit 102 can comprise a plurality of processors, memory and storage units, and inertial measurement units (IMUs). The context camera assembly 104 and the LPR camera assembly 106 can be coupled to the control unit 102 via high-speed buses, communication cables or wires, and/or other types of wired or wireless interfaces. The components within each of the control unit 102, the context camera assembly 104, or the LPR camera assembly 106 can also be connected to one another via high-speed buses, communication cables or wires, and/or other types of wired or wireless interfaces.

The processors of the control unit 102 can include one or more central processing units (CPUs), graphical processing units (GPUs), Application-Specific Integrated Circuits (ASICs), field-programmable gate arrays (FPGAs), or a combination thereof. The processors can execute software stored in the memory and storage units to execute the methods or instructions described herein.

For example, the processors can refer to one or more GPUs and CPUs of a processor module configured to perform operations or undertake calculations. As a more specific example, the processors can perform operations or undertake calculations at a terascale. In some embodiments, the processors of the control unit 102 can be configured to perform operations at 21 teraflops (TFLOPS).

The processors of the control unit 102 can be configured to run multiple deep learning models or neural networks in parallel and process data received from the context camera assembly 104, the LPR camera assembly 106, or a combination thereof. More specifically, the processor module can be a Jetson Xavier NX™ module developed by NVIDIA Corporation. The processors can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the system 100.

The memory and storage units can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multimedia controller (eMMC) storage. For example, the memory and storage units can comprise a 512 gigabyte (GB) SSD, an 8 GB 128-bit LPDDR4x memory, and 16 GB eMMC 5.1 storage device. The memory and storage units can store software, firmware, data (including video and image data), tables, logs, databases, or a combination thereof.

Each of the IMUs can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

For purposes of this disclosure, any references to the system 100 can also be interpreted as a reference to a specific component, processor, module, chip, or circuitry within a component of the system 100.

The communication and positioning unit 108 can comprise at least one of a cellular communication module, a WiFi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the control unit 102 to communicate over a WiFi network such as a WiFi network provided by a carrier vehicle 128, a municipality, a business, or a combination thereof. The WiFi communication module can allow the control unit 102 to communicate over one or more WiFi (IEEE 802.11) commination protocols such as the 802.11n, 802.11ac, or 802.11ax protocol.

The Bluetooth® module can allow the control unit 102 to communicate with other control units on other carrier vehicles over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The communication and positioning unit 108 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the communication and positioning unit 108 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the communication and positioning unit 108 can be configured to receive signals from all four of the aforementioned satellite navigation systems or three out of the four satellite navigation systems. For example, the communication and positioning unit 108 can be a ZED-F9K dead reckoning module provided by u-blox holding AG.

The communication and positioning unit 108 can provide positioning data that can allow the perception system 100 to determine its own location at a centimeter-level accuracy.

The communication and positioning unit 108 can also provide positioning data that can be used by the control unit 102 of the system 100 to determine the location of an offending vehicle. For example, the control unit 102 can use positioning data concerning its own location to substitute for the location of the offending vehicle. The control unit 102 can also use positioning data concerning its own location to estimate or approximate the location of the offending vehicle.

The context camera assembly 104 can comprise a context camera 112, a context camera housing 113, a context camera mount 114, and a context camera skirt 116. The context camera 112, the context camera housing 113, the context camera mount 114, and the context camera skirt 116 will be discussed in more detail in the following sections.

The LPR camera assembly 106 can comprise one or more LPR cameras 118, an LPR camera housing 119, an LPR camera mount 120, and one or more LPR camera skirts 122. The LPR cameras 118, the LPR camera housing 119, the LPR camera mount 120, and the LPR camera skirts 122 will be discussed in more detail in the following sections.

As will be discussed in more detail in the following sections, the context camera skirt 116 can be designed to act as a light-blocking shield or funnel to block unwanted ambient light or light originating from outside and/or inside of the carrier vehicle 128 (e.g., artificial lights). In addition, the LPR camera skirts 122 can be designed to act as a light-blocking shield or funnel to block unwanted ambient light or light originating from outside and/or inside of the carrier vehicle 128. Such unwanted light can cause lens flares, discoloration, or glare and reduce the contrast of images or videos captured by such cameras.

The context camera 112 can be configured to capture video at a frame rate of between 1 frame per second and 120 frames per second (FPS) (e.g., about 20 FPS or 30 FPS). The context camera 112 can be a high-dynamic range (HDR) camera. The HDR camera can capture video images at a minimum resolution of 1920×1080 (or 2 megapixels). In some embodiments, the context camera 112 can comprise CMOS image sensors provided by OMNIVISION Technologies, Inc.

At least one of the LPR cameras 118 can comprise a fixed-focal or varifocal telephoto lens. At least one of the LPR cameras 118 can capture video images at a minimum resolution of 1920×1080 (or 2 megapixels). At least one of the LPR cameras 118 can also capture video at a frame rate of between 1 frame per second and 120 FPS (e.g., about 20 FPS or 30 FPS). In other embodiments, At least one of the LPR cameras 118 can also capture video at a frame rate of between 20 FPS and 80 FPS. In some embodiments, at least one of the LPR cameras 118 can comprise CMOS image sensors provided by OMNIVISION Technologies, Inc.

As will be discussed in more detail in later sections, the LPR camera assembly 106 can comprise a plurality of IR or NIR light-emitting diodes (LEDs) and one or more IR or NIR cameras that allow the LPR camera assembly 106 to operate at night or in low-light conditions.

In some embodiments, the video(s) captured by the context camera 112 can be used by the control unit 102 to determine a context surrounding the traffic violation event or to determine which vehicles were at fault in committing a traffic violation or potential traffic violation. In these and other embodiments, the video(s) captured by the LPR cameras 118 can be used by the control unit 102 to automatically recognize license plate numbers of vehicles involved in the traffic violation event.

In alternative embodiments, the video(s) captured by the LPR cameras 118 can also be used by the control unit 102 to determine a context surrounding the traffic violation event or to determine which vehicles were at fault in committing a traffic violation or potential traffic violation. Similarly, the video(s) captured by the context camera 112 can also be used by the control unit 102 to automatically recognize license plate numbers of vehicles involved in the traffic violation event.

The context camera 112 and the one or more LPR cameras 118 can be connected or communicatively coupled to the control unit 102 via high-speed camera interfaces such as a Mobile Industry Processor Interface (MIPI) camera serial interface.

In alternative embodiments, the control unit 102 can also be coupled to built-in video image sensors of the carrier vehicle 128. For example, any reference to either the context camera 112 or one of the LPR cameras 118 can also refer to one or more built-in cameras included as part of the carrier vehicle's Advanced Driver Assistance Systems (ADAS).

In some embodiments, the control unit 102 can determine the location of an offending vehicle by recognizing an object or landmark (e.g., a bus stop sign) near the offending vehicle with a known geolocation associated with the object or landmark. In these embodiments, the control unit 102 can use the location of the object or landmark as the location of the offending vehicle. In further embodiments, the location of the offending vehicle can be determined by factoring in a distance calculated between the control unit 102 and the offending vehicle based on a size of the license plate shown in one or more video frames of the video captured by one of the LPR cameras 118 and a lens parameter of one of the LPR cameras 118 (e.g., a zoom factor of the lens).

FIG. 1A also illustrates that the perception system 100 can comprise a vehicle bus connector 110 coupled to the control unit 102. For example, the vehicle bus connector 110 can allow the control unit 102 to obtain wheel odometry data from a wheel odometer of a carrier vehicle 128 carrying the system 100. For example, the vehicle bus connector 110 can be a J1939 connector. The control unit 102 can take into account the wheel odometry data to determine the location of an offending vehicle.

The system 100 can also comprise a power management integrated circuit (PMIC). The PMIC can be used to manage power from a power source. In some embodiments, the components of the perception system 100 can be powered by a portable power source such as a battery. In other embodiments, one or more components of the perception system 100 can be powered via a physical connection (e.g., a power cord) to a power outlet or direct-current (DC) auxiliary power outlet (e.g., 12V/24V) of a carrier vehicle 128 carrying the perception system 100.

The control unit 102 of the system 100 can be communicatively coupled to or in wireless communication with a server (not shown). The server can comprise or refer to one or more virtual servers or virtualized computing resources. For example, the server can refer to a virtual server or cloud server hosted and delivered by a cloud computing platform (e.g., Amazon Web Services®, Microsoft Azure®, or Google Cloud®). In other embodiments, the server can refer to one or more stand-alone servers such as a rack-mounted server, a blade server, a mainframe, a dedicated desktop or laptop computer, one or more processors or processor cores therein, or a combination thereof.

The server can be communicatively coupled to or in wireless communication with a plurality of control units 102 over one or more networks. Each of the control units 102 can be part of a perception system 100 coupled to a carrier vehicle 128 (e.g., a fleet vehicle such as a city bus, see FIG. 1C).

In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server and the plurality of perception systems 100 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The control unit 102 of the system 100 can transmit data and files to the server and receive data and files from the server via secure connections. The secure connections can be real-time bidirectional connections secured using one or more encryption protocols such as a secure sockets layer (SSL) protocol, a transport layer security (TLS) protocol, or a combination thereof. Additionally, data or packets transmitted over the secure connection can be encrypted using a Secure Hash Algorithm (SHA) or another suitable encryption algorithm. Data or packets transmitted over the secure connection can also be encrypted using an Advanced Encryption Standard (AES) cipher.

The server can store data and files received from the control unit 102 in one or more databases. In some embodiments, the database can be a relational database. In further embodiments, the database can be a column-oriented or key-value database. In certain embodiments, the database can be stored in a server memory or storage unit. In other embodiments, the database can be distributed among multiple storage nodes.

As will be discussed in more detail in the following sections, each of the systems 100 can be carried by or installed in a carrier vehicle 128 (see FIG. 1C). For example, the context camera assembly 104 and the LPR camera assembly 106 of the system 100 can be secured, mounted, or otherwise coupled to a ceiling or headliner 400 (see FIGS. 4A, 4B, 5B, and 5C) of the carrier vehicle 128. In some embodiments, the control unit 102 can be coupled to a dashboard, console, or instrument panel of the carrier vehicle 128. In these embodiments, the context camera 112 and the one or more LPR cameras 118 can be positioned behind a windshield 402 of the carrier vehicle 128.

When properly positioned behind the windshield 402 of the carrier vehicle 128, the context camera 112 and the one or more LPR cameras 118 can capture videos of an external environment within a field view of the cameras. The control unit 102 of each of the systems 100 can then process and analyze video frames from such videos using certain computer vision tools from a computer vision library and a plurality of deep learning models to detect whether a potential traffic violation has occurred. If a control unit 102 determines that a potential traffic violation has occurred, the control unit 102 can transmit data and files concerning the potential traffic violation (e.g., in the form of an evidence package) to the server.

Figure 1B:
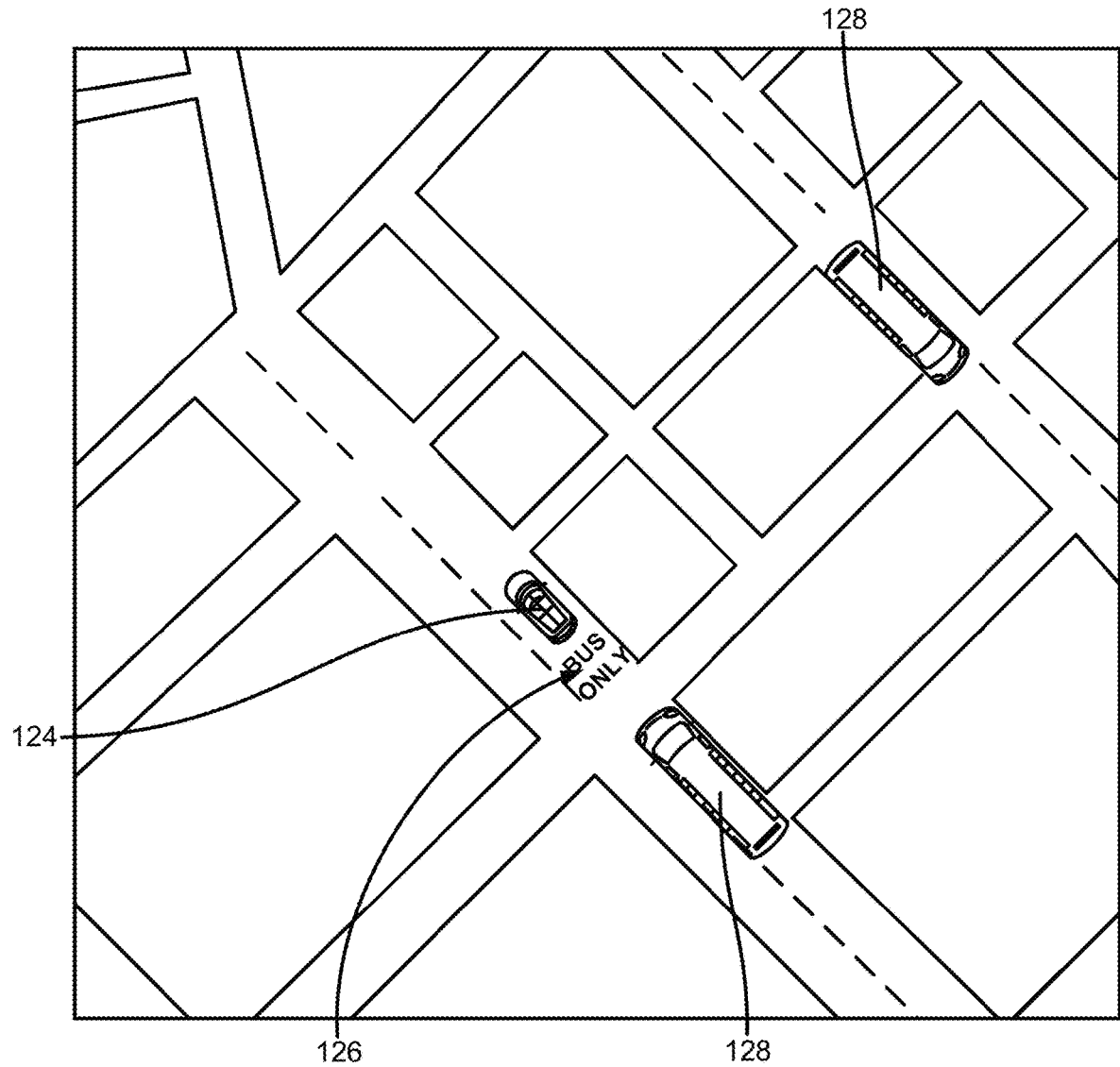
FIG. 1B illustrates a scenario where the camera-based perception system can be utilized to detect a traffic violation committed by an offending vehicle.

FIG. 1B illustrates an example scenario where the system 100 of FIG. 1A can be utilized to detect a traffic violation. An offending vehicle 124 can be parked or otherwise stopped in a restricted road area 126. The restricted road area 126 can be a bus lane, a bike lane, a no-parking or no-stopping zone (e.g., a no-parking zone in front of a red curb or fire hydrant), a pedestrian crosswalk, or a combination thereof. In other embodiments, the restricted road area 126 can be a restricted parking spot where the offending vehicle 124 does not have the necessary credentials or authorizations to park in the parking spot. The restricted road area 126 can be marked by certain insignia, text, nearby signage, road or curb coloration, or a combination thereof. In other embodiments, the restricted road area 126 can be designated or indicated in a private or public database (e.g., a municipal GIS database) accessible by the control unit 102 of the system 100, the server, or a combination thereof.

The traffic violation can also include illegal double-parking, parking in a space where the time has expired, or parking too close to a fire hydrant.

A carrier vehicle 128 (see also, FIG. 1C) having a perception system 100 (see, e.g., FIG. 1A) installed within the carrier vehicle 128 can drive by (i.e., next to) or behind the offending vehicle parked, stopped, or driving in the restricted road area 126. For example, the carrier vehicle 128 can be driving in a lane or other roadway blocked by the offending vehicle 124. Alternatively, the carrier vehicle 128 can be driving in an adjacent roadway such as a lane next to the restricted road area 126. The carrier vehicle 128 can encounter the offending vehicle 124 while traversing its daily route (e.g., bus route, garbage collection route, etc.).

The perception system 100 can capture videos of the offending vehicle 124 and at least part of the restricted road area 126 using the context camera 112 of the context camera assembly 104 and the one or more LPR cameras 118 of the LPR camera assembly 106. In one embodiment, the videos can be videos in the MPEG-4 Part 12 or MP4 file format. In other embodiments, the videos can refer to a compiled video comprising multiple videos captured by the context camera 112, the one or more LPR cameras 118, or a combination thereof. In further embodiments, the videos can refer to all of the videos captured by the context camera 112 and/or the one or more LPR cameras 118.

The control unit 102 of the system 100 can then determine a location of the offending vehicle 124 using, in part, a positioning data obtained from the communication and positioning unit 108. The perception system 100 can also determine the location of the offending vehicle 124 using, in part, inertial measurement data obtained from an IMU and wheel odometry data obtained from a wheel odometer of the carrier vehicle 128 via the vehicle bus connector 110.

One or more processors of the control unit 102 can also be programmed to automatically identify objects from the videos by applying a plurality of functions from a computer vision library to the videos to, among other things, read video frames from the videos and pass at least some of the video frames from the videos to a plurality of deep learning models (see, e.g., one or more convolutional neural networks) running on the control unit 102. For example, the offending vehicle 124 and the restricted road area 126 can be identified as part of this object detection step.

In some embodiments, the one or more processors of the control unit 102 can also pass at least some of the video frames of the videos to one or more deep learning models running on the control unit 102 or the server to identify a set of vehicle attributes of the offending vehicle 124. The set of vehicle attributes can include a color of the offending vehicle 124, a make and model of the offending vehicle 124 and a vehicle type of the offending vehicle 124 (e.g., whether the offending vehicle 124 is a personal vehicle or a public service vehicle such as a fire truck, ambulance, parking enforcement vehicle, police car, etc.).

At least one of the videos can comprise a video frame or image showing a license plate of the offending vehicle 124. The control unit 102 can pass the video frame captured by one of the LPR cameras 118 to a license plate recognition engine (e.g., a license plate recognition deep learning model) running on the control unit 102 to recognize an alphanumeric string representing a license plate of the offending vehicle 124.

In other embodiments not shown in the figures, the license plate recognition engine can be run on the server. In further embodiments, the license plate recognition engine can be run on the control unit 102 and the server.

The control unit 102 of the system 100 can also wirelessly transmit an evidence package comprising a segment of the video, the positioning data, certain timestamps, the set of vehicle attributes, and an alphanumeric string representing a license plate of the offending vehicle 124 to the server.

Each system 100 can be configured to continuously take videos of its surrounding environment (i.e., an environment outside of the carrier vehicle 128) as the carrier vehicle 128 traverses its usual carrier route. In some embodiments, the one or more processors of each control unit 102 can periodically or continuously transmit such videos and mapping data in the form of evidence packages to the server.

The server can confirm or further determine that a traffic violation has occurred based in part on comparing data and videos received from multiple systems 100 (where each system 100 is mounted or otherwise coupled to a different carrier vehicle 128).

Figure 1C:
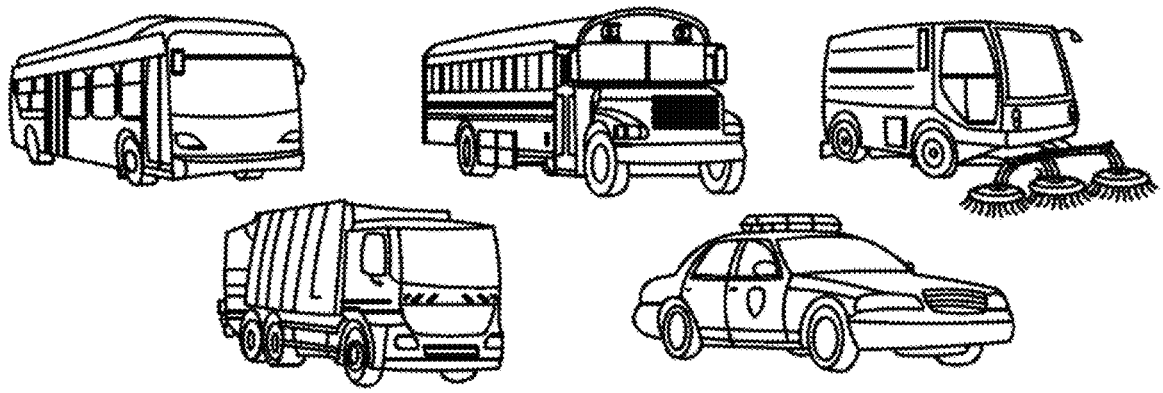
FIG. 1C illustrates different examples of carrier vehicles that can be used to carry the camera-based perception system.
Figure 1C:
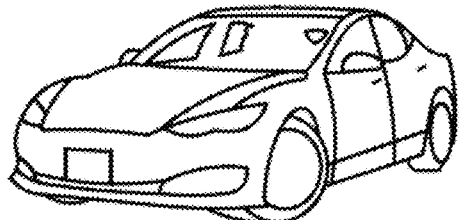
Figure 1C:
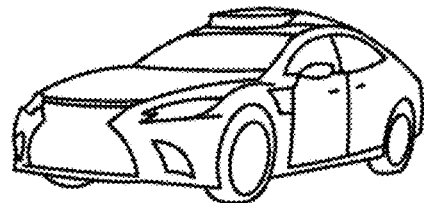

FIG. 1C illustrates that, in some embodiments, the carrier vehicle 128 can be a municipal fleet vehicle. For example, the carrier vehicle 128 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 128 can be a semi-autonomous vehicle such as a vehicle operating in one or more self-driving modes with a human operator in the vehicle. In further embodiments, the carrier vehicle 128 can be an autonomous vehicle or self-driving vehicle.

In certain embodiments, the carrier vehicle 128 can be a private vehicle or vehicle not associated with a municipality or government entity.

Figure 2A:
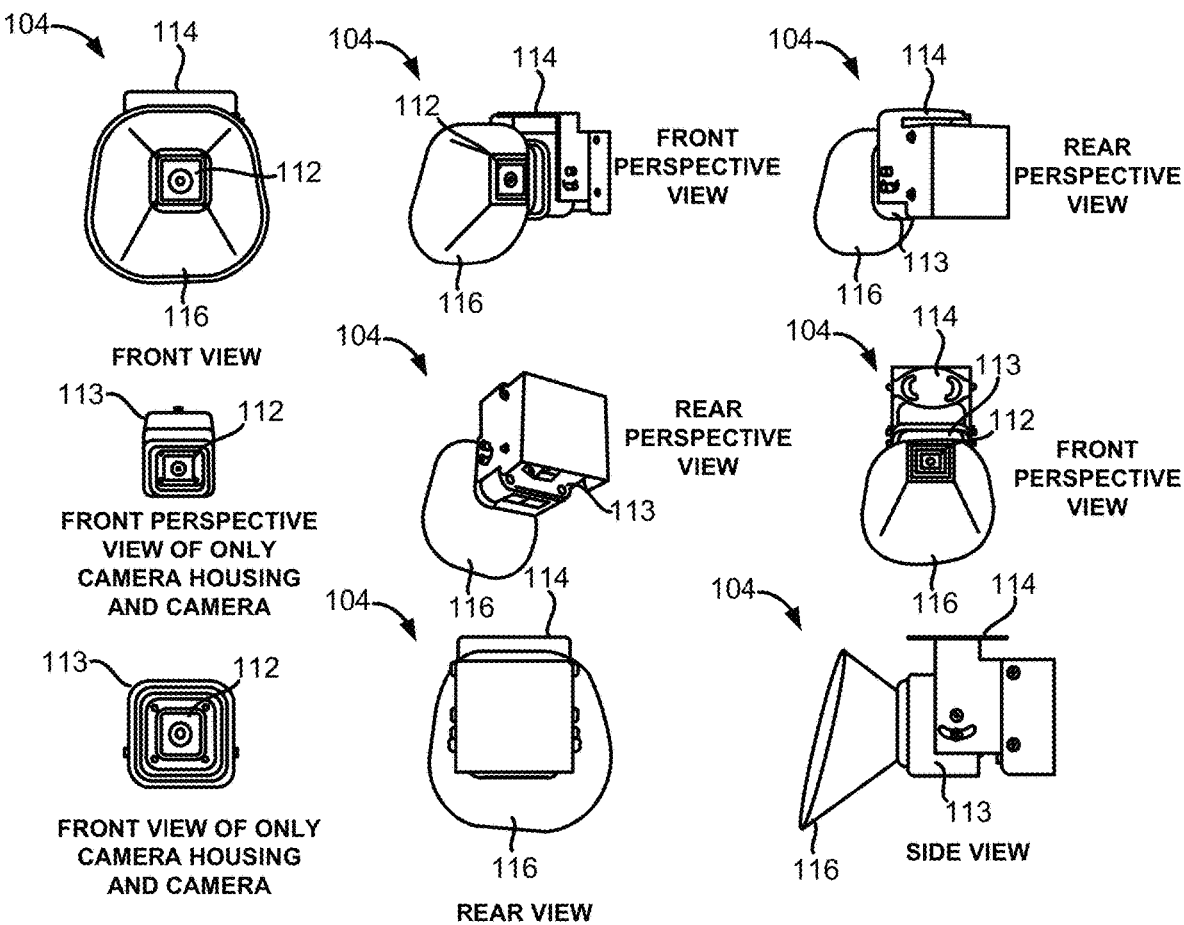
FIG. 2A illustrates multiple views (e.g., multiple perspective views, front views, rear views, side view, etc.) of one embodiment of a context camera assembly of the camera-based perception system.

FIG. 2A illustrates multiple views (e.g., multiple perspective views, front views, rear views, side view, etc.) of one embodiment of the context camera assembly 104. Moreover, FIG. 2A also illustrates front and top perspective views of only the context camera housing 113 containing the context camera 112.

As shown in FIG. 2A, the context camera assembly 104 can comprise a context camera mount 114 operably coupled to a context camera housing 113 containing a context camera 112. Moreover, a context camera skirt 116 or camera hood can be coupled to and protrude outwardly from a front face or front side of the context camera housing 113. At least part of the field of view of the context camera 112 can be partially shrouded or covered by the context camera skirt 116.

The context camera housing 113 can be made of a metallic material such as aluminum. In other embodiments, the context camera housing 113 can be made of a polymeric material. In certain embodiments, the context camera housing 113 can be substantially shaped as a cuboid or a rectangular prism. For example, the context camera housing 113 can have a length dimension between 35 mm and 45 mm, a width dimension between 40 mm and 50 mm, and a height dimension between 30 mm and 50 mm.

In some embodiments, the context camera mount 114 can be coupled to the sides of the context camera housing 113. For example, the context camera mount 114 can comprise a mount rack or mount plate positioned vertically above the context camera housing 113. The context camera mount 114 can be coupled or otherwise affixed to the context camera housing 113 via screws, nuts, and bolts, or other types of fasteners. The mount rack or mount plate of the context camera mount 114 can allow the context camera assembly 104 to be mounted, fastened, or otherwise coupled to a ceiling and/or a headliner covering the ceiling of the carrier vehicle 128.

In some embodiments, the mount rack or mount plate of the context camera mount 114 can comprise one or more slotted openings, curved slits, or through-holes to allow the context camera assembly 104 to be mounted or affixed to the ceiling and/or headliner of a carrier vehicle 128 via screws or other fasteners, clips, and nuts and bolts. In other embodiments, the context camera mount 114 can comprise one or more flat or texturized surfaces to allow the flat or texturized surfaces to be adhered to the ceiling and/or headliner of a carrier vehicle 128 via adhesives (e.g., very high bonding (VHB) adhesives or ultra-high bonding (UHB) adhesives). Furthermore, the context camera mount 114 can comprise one or more metallic surfaces to allow the context camera mount 114 to be coupled to the ceiling of a carrier vehicle 128 via magnetic connectors/magnets.

In additional embodiments, the context camera mount 114 can comprise one or more suction cups to allow the context camera assembly 104 to be coupled to the ceiling of a carrier vehicle 128 or the windshield 402 of a carrier vehicle 128 via the suction cups.

The context camera mount 114 can also allow the context camera housing 113 to be mounted in such a way that a camera lens of the context camera 112 faces the windshield 402 directly (see FIGS. 4A, 4B, 5B, and 5C) or is substantially parallel with the front windshield 402 of the carrier vehicle 128. This can allow the context camera 112 to take video(s) of its surrounding environment including an environment outside of the carrier vehicle 128. The context camera mount 114 can also allow an installer to adjust a pitch/tilt and/or swivel/yaw of the context camera housing 113 to account for a tilt or curvature of the windshield 402.

In certain embodiments, the context camera 112 can comprise a high dynamic range (HDR) CMOS image sensor manufactured or distributed by OmniVision Technologies, Inc. For example, the context camera 112 can comprise an HDR CMOS image sensor having a resolution of 1920× 1280.

In some embodiments, the field of view of the context camera 112 can be less than 180 degrees (horizontal). For example, the field of view of the context camera 112 can be between about 60 degrees and about 120 degrees (horizontal).

The context camera skirt 116 or camera hood can partially shroud or block part of the field of view of the context camera 112. The context camera skirt 116 can also block or reduce the amount of light emanating from an interior of the carrier vehicle 128 to prevent the interior lights from interfering with the image sensor of the context camera 112. For example, when the carrier vehicle 128 is a municipal bus, the interior of the municipal bus can be lit by artificial lights (e.g., fluorescent lights, LED lights, etc.) to ensure passenger safety. The context camera skirt 116 can block or reduce the amount of artificial light that reaches the context camera 112 to prevent this light from degrading the video(s) captured by the context camera 112.

The context camera skirt 116 can be designed to have a tapered or narrowed end and a wide flared end. The tapered end of the context camera skirt 116 can be coupled to a front portion or front face/side of the context camera housing 113 or context camera 112. The context camera skirt 116 can also comprise a skirt distal edge 200 (see FIG. 2B) defining the wide flared end.

As previously discussed, the context camera assembly 104 can be coupled to the ceiling and/or headliner of the carrier vehicle 128 with the camera lens of the context camera 112 facing the windshield 402 of the carrier vehicle 128. The context camera assembly 104 can be mounted or otherwise coupled in such a way that the skirt distal edge 200 of the context camera skirt 116 is close to but does not physically contact or touch the windshield 402 of the carrier vehicle 128. For example, the context camera assembly 104 can be mounted or otherwise coupled in such a way that the skirt distal edge 200 of the context camera skirt 116 is separated from the windshield 402 by a separation distance. In some embodiments, the separation distance can be between about 1.0 cm and 10.0 cm. More specifically, the separation distance can be less than 3.0 cm.

In some embodiments, the context camera skirt 116 can be made of a dark-colored non-transparent polymeric material. In certain embodiments, the context camera skirt 116 can be made of a polymeric material having a Shore hardness of about 90 A. For example, the context camera skirt 116 can be made of a non-reflective material. As a more specific example, the context camera skirt 116 can be made of a dark-colored thermoplastic elastomer such as thermoplastic polyurethane (TPU).

In some embodiments, the context camera skirt 116 can have a thickness of between about 2.00 mm and 2.50 mm. For example, the context camera skirt 116 can have a thickness of about 2.33 mm.

Moreover, the context camera skirt 116 can be made using a dark-colored or heavily pigmented polymeric material. For example, the context camera skirt 116 can be made using a black-colored polymeric material. Furthermore, the context camera skirt 116 can be colored black or a black/dark-colored coating can be applied to the context camera skirt 116 after the skirt has been manufactured or 3D-printed.

Figure 2B:
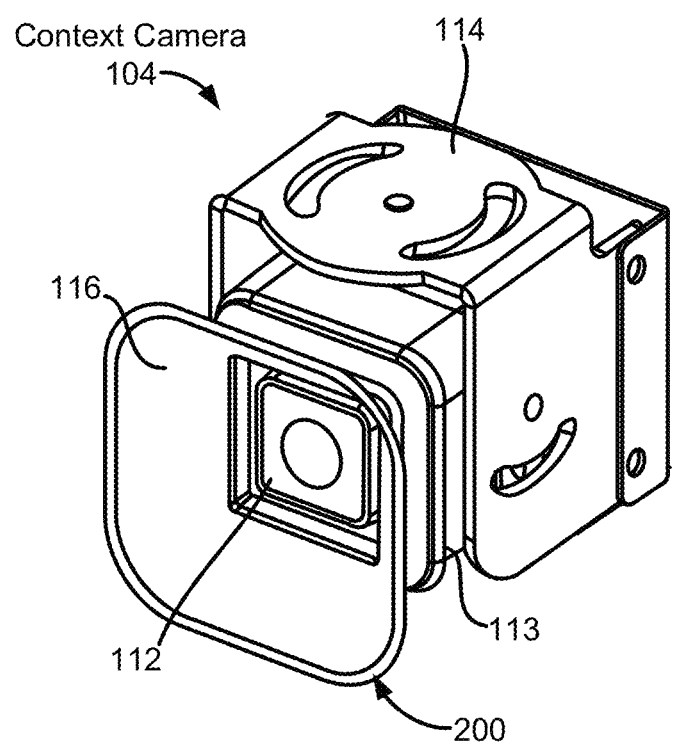
FIG. 2B illustrates a perspective view of another embodiment of the context camera assembly.

FIG. 2B illustrates a perspective view of another embodiment of the context camera assembly 104. As shown in FIG. 2B, the context camera assembly 104 can comprise a context camera housing 113 containing a context camera 112, a context camera mount 114 coupled to the context camera housing 113, and a context camera skirt 116 coupled to a front face or front portion of the context camera housing 113 or the context camera 112. The context camera skirt 116 is configured to partially shroud or partially cover a field of view of the context camera 112.

The context camera skirt 116 can comprise a tapered or narrowed end and a wide flared end. The tapered end of the context camera skirt 116 can be coupled to or near the front portion or the front face of the context camera housing 113 or the context camera 112. The context camera skirt 116 can also comprise a skirt distal edge 200 defining the wide flared end.

As shown in FIG. 2B, the skirt distal edge 200 can be substantially shaped as a square having rounded corners. In other embodiments, the skirt distal edge 200 can be substantially shaped as a rectangle with a length of the skirt distal edge 200 greater than the width of the skirt distal edge 200. When the skirt distal edge 200 is substantially shaped as a rectangle, the entire flared context camera skirt 116 can be substantially shaped as a truncated rectangular pyramid or a trapezoidal prism having slightly rounded corners.

In other embodiments, the skirt distal edge 200 can be substantially shaped as a polygon with no pairs of congruent sides and/or no pairs of parallel sides (see FIG. 2A). For example, the skirt distal edge 200 can be substantially shaped as a quadrilateral with no pairs of congruent sides and/or no pairs of parallel sides. In certain embodiments, the skirt distal edge 200 can define a shape or footprint that is asymmetric about a midline bisecting the shape or footprint.

In additional embodiments, the skirt distal edge 200 can be substantially shaped as a polygon with only one pair of congruent sides and/or only one pair of parallel sides.

In further embodiments, the skirt distal edge 200 can be substantially circular-shaped, elliptical-shaped, or stadium-shaped. For example, the context camera skirt 116 can be substantially shaped as a truncated conic or frustoconic.

Figure 3A:
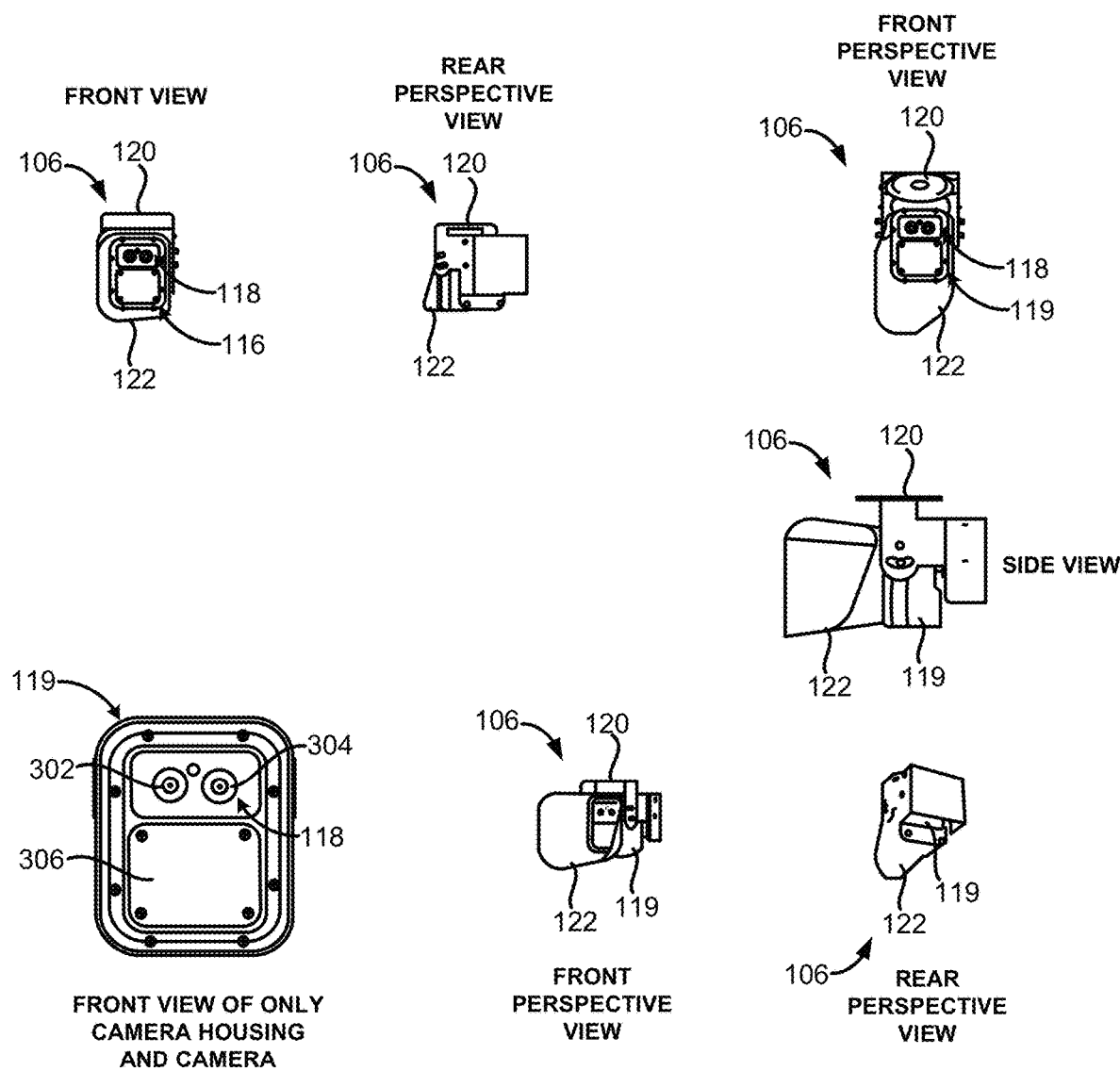
FIG. 3A illustrates multiple views (e.g., multiple perspective views, front views, rear views, side view, etc.) of one embodiment of an LPR camera assembly of the camera-based perception system.

FIG. 3A illustrates multiple views (e.g., multiple perspective views, front views, rear views, side view, etc.) of one embodiment of the LPR camera assembly 106. Moreover, FIG. 3A also illustrates a front view of only the LPR camera housing 119 containing the LPR cameras 118.

As shown in FIG. 3A, the LPR camera assembly 106 can comprise one or more LPR cameras 118 contained within an LPR camera housing 119, an LPR camera mount 120 operably coupled to the LPR camera housing 119, and at least one LPR camera skirt 122 or camera hood coupled to and protruding outwardly from a front face or front side of the LPR camera housing 119. At least part of the field of view of one of the LPR cameras 118 can be partially shrouded or covered by the at least one LPR camera skirt 122.

The LPR camera housing 119 can be made of a metallic material such as aluminum. In other embodiments, the LPR camera housing 119 can be made of a polymeric material. In certain embodiments, the LPR camera housing 119 can be substantially shaped as a cuboid or a rectangular prism. For example, the LPR camera housing 119 can have a length dimension between 35 mm and 45 mm, a width dimension between 40 mm and 50 mm, and a height dimension between 30 mm and 50 mm.

In some embodiments, the LPR camera mount 120 can be coupled to the sides of the LPR camera housing 119. For example, the LPR camera mount 120 can comprise a mount rack or mount plate positioned vertically above the LPR camera housing 119. The LPR camera mount 120 can be coupled or otherwise affixed to the LPR camera housing 119 via screws, nuts, and bolts, or other types of fasteners. The mount rack or mount plate of the LPR camera mount 120 can allow the LPR camera assembly 106 to be mounted, fastened, or otherwise coupled to a ceiling and/or a headliner covering the ceiling of the carrier vehicle 128.

In some embodiments, the mount rack or mount plate of the LPR camera mount 120 can comprise one or more slotted openings, curved slits, or through-holes to allow the LPR camera assembly 106 to be mounted or affixed to the ceiling and/or headliner of a carrier vehicle 128 via screws or other fasteners, clips, and nuts and bolts. In other embodiments, the LPR camera mount 120 can comprise one or more flat or texturized surfaces to allow the flat or texturized surfaces to be adhered to the ceiling and/or headliner of a carrier vehicle 128 via adhesives (e.g., very high bonding (VHB) adhesives or ultra-high bonding (UHB) adhesives). Furthermore, the LPR camera mount 120 can comprise one or more metallic surfaces to allow the LPR camera mount 120 to be coupled to the ceiling of a carrier vehicle 128 via magnetic connectors/magnets.

In additional embodiments, the LPR camera mount 120 can comprise one or more suction cups to allow the LPR camera assembly 106 to be coupled to the ceiling of a carrier vehicle 128 or the windshield 402 of a carrier vehicle 128 via the suction cups.

The LPR camera mount 120 can also allow the LPR camera housing 119 to be mounted in such a way that a camera lens of one of the LPR cameras 118 faces the windshield 402 (see FIGS. 4A, 4B, 5B, and 5C) at an angle. This can allow the LPR cameras 118 to capture video(s) of license plates of vehicles near the carrier vehicle 128. The LPR camera mount 120 can also allow an installer to adjust a pitch/tilt and/or swivel/yaw of the LPR camera housing 119 to account for a tilt or curvature of the windshield 402.

The LPR camera mount 120 can be designed to allow the entire LPR camera assembly 106 to face the windshield 402 of the carrier vehicle 128 at an angle (see FIGS. 4A, 4B, 5B, and 5C). This can allow the one or more LPR cameras 118 to take videos of license plates of vehicles directly in front of or on one side (e.g., a right side or left side) of the carrier vehicle 128.

As shown in FIG. 3A, the LPR camera housing 119 can comprise at least two LPR cameras 118 including at least one daytime LPR camera 302 and at least one nighttime LPR camera 304. The daytime LPR camera 302 can be a camera configured to capture images or videos in the daytime or when sunlight is present. Moreover, the daytime LPR camera 302 can be a camera configured to capture images or videos in the visible spectrum. The nighttime LPR camera 304 can be an infrared (IR) or near-infrared (NIR) camera configured to capture images or videos in low-light conditions or at nighttime.

In certain embodiments, the daytime LPR camera 302 can comprise a CMOS image sensor manufactured or distributed by OmniVision Technologies, Inc. For example, the daytime LPR camera 302 can comprise the OmniVision OV2311 CMOS image sensor configured to capture videos between 20 FPS and 60 FPS.

In some embodiments, the field of view of the daytime LPR camera 302 can be less than 180 degrees (horizontal). For example, the field of view of the daytime LPR camera 302 can be between about 60 degrees and about 120 degrees (horizontal).

In these and other embodiments, the nighttime LPR camera 304 can comprise IR or NIR image sensors manufactured or distributed by OmniVision Technologies, Inc.

In other embodiments not shown in the figures, the LPR camera assembly 106 can comprise one camera with both daytime and nighttime capture capabilities. For example, the LPR camera assembly 106 can comprise one camera comprising an RGB-IR image sensor.

As will be discussed in more detail in the following sections, the LPR camera housing 119 can also comprise a plurality of IR or NIR light-emitting diodes (LEDs) 320 configured to emit IR or NIR light to illuminate an event scene in low-light or nighttime conditions. In some embodiments, the IR/NIR LEDs 320 can be arranged as an IR/NIR light array 322 (see FIG. 3D).

Figure 3B:
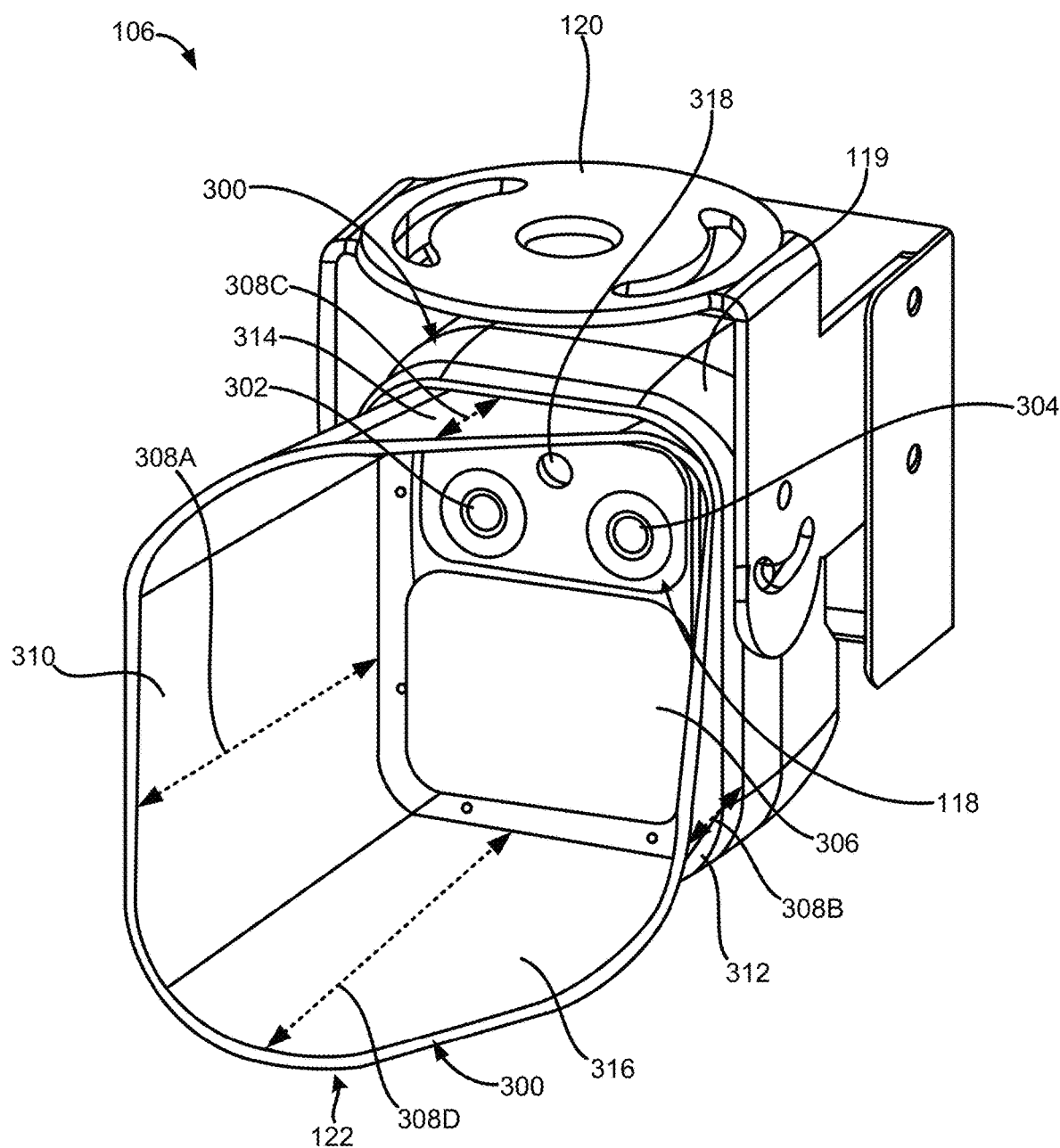
FIG. 3B illustrates a close-up perspective view of the LPR camera assembly.
Figure 3C:
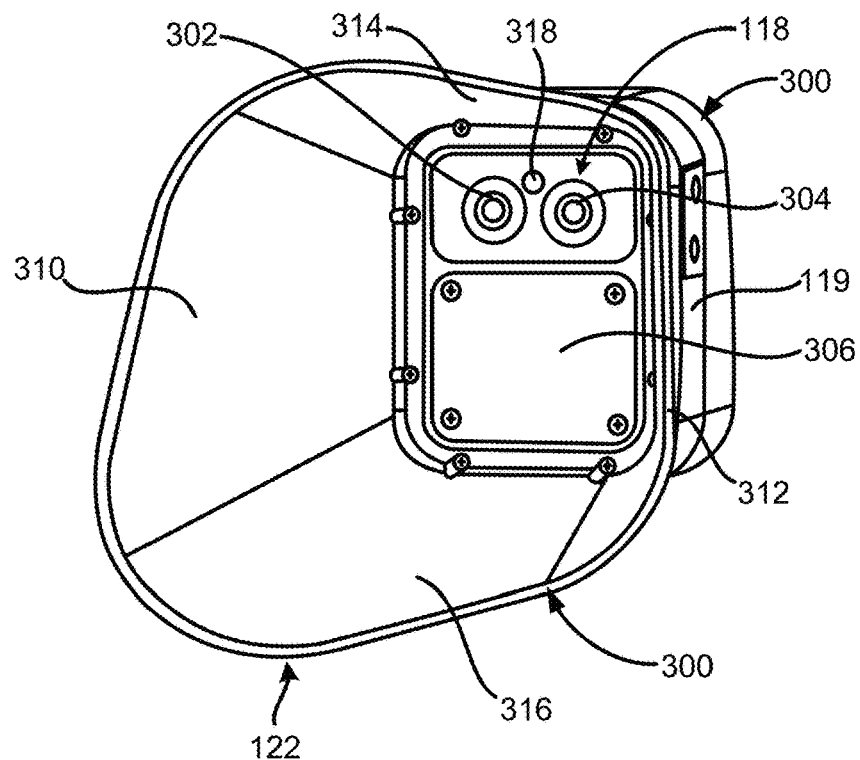
FIG. 3C illustrates a perspective view of part of one embodiment of an LPR camera assembly with the LPR camera mount removed and an IR bandpass filter covering the IR LEDs.

As shown in FIGS. 3A to 3C, the IR LEDs 320 can be covered by an IR bandpass filter 306. The IR bandpass filter 306 can allow only radiation in the IR range or NIR range (between about 780 nm to about 1500 nm) to pass while blocking light in the visible spectrum (between about 380 nm to about 700 nm).

In some embodiments, the IR bandpass filter 306 can be an optical-grade polymer-based filter or a piece of high-quality polished glass. For example, the IR bandpass filter 306 can be made of an acrylic material (optical-grade acrylic) such as an infrared transmitting acrylic sheet. As a more specific example, the IR bandpass filter 306 can be a piece of poly(methyl methacrylate) (PMMA) (e.g., Plexi-glass™) that covers the IR LEDs 320.

The at least one LPR camera skirt 122 or camera hood can block or reduce the amount of light emanating from an interior of the carrier vehicle 128 to prevent the interior lights from interfering with the image sensors of the LPR cameras 118. For example, when the carrier vehicle 128 is a municipal bus, the interior of the municipal bus can be lit by artificial lights (e.g., fluorescent lights, LED lights, etc.) to ensure passenger safety. The at least one LPR camera skirt 122 can block or reduce the amount of artificial light that reaches the LPR cameras 118 to prevent this light from degrading the video(s) captured by the LPR cameras 118.

The at least one LPR camera skirt 122 can comprise a tapered or narrowed end and a wide flared end. The tapered end of the LPR camera skirt 122 can be coupled to a front portion or front face/side (or distal portion) of the LPR camera housing 119 or one of the LPR cameras 118. The LPR camera skirt 122 can also comprise a skirt distal edge 300 (see FIG. 3B) defining the wide flared end.

The LPR camera assembly 106 can be coupled to the ceiling and/or headliner of the carrier vehicle 128 with the camera lenses of the LPR cameras 118 facing the windshield 402 of the carrier vehicle 128 at an angle. The LPR camera assembly 106 can be mounted or otherwise coupled in such a way that the skirt distal edge 300 is close to but does not physically contact or touch the windshield 402 of the carrier vehicle 128. For example, the LPR camera assembly 106 can be mounted or otherwise coupled in such a way that the skirt distal edge 300 is separated from the windshield 402 of the carrier vehicle 128 by a separation distance. In some embodiments, the separation distance can be between about 1.0 cm and 10.0 cm. More specifically, the separation distance can be less than 3.0 cm.

In some embodiments, the LPR camera skirt 122 can be made of a dark-colored non-transparent polymeric material. In certain embodiments, the LPR camera skirt 122 can be made of a polymeric material having a Shore hardness of about 90 A. For example, the LPR camera skirt can be made of a non-reflective material. As a more specific example, the LPR camera skirt 122 can be made of a dark-colored thermoplastic elastomer such as thermoplastic polyurethane (TPU).

In some embodiments, the LPR camera skirt 122 can have a thickness of between about 2.00 mm and 2.50 mm. For example, the LPR camera skirt 122 can have a thickness of about 2.33 mm.

Moreover, the LPR camera skirt 122 can be made using a dark-colored or heavily pigmented polymeric material. For example, the LPR camera skirt 122 can be made using a black-colored polymeric material. Furthermore, the LPR camera skirt 122 can be colored black or a black/dark-colored coating can be applied to the LPR camera skirt 122 after the skirt has been manufactured or 3D-printed.

FIG. 3B illustrates a close-up perspective view of the LPR camera assembly 106. As shown in FIG. 3B, the skirt distal edge 300 of the LPR camera skirt 122 can be substantially shaped as a polygon with no pairs of congruent sides and/or no pairs of parallel sides (see, also, FIGS. 3C and 3D). For example, the skirt distal edge 300 can be substantially shaped as a quadrilateral with no pairs of congruent sides and/or no pairs of parallel sides. In certain embodiments, the skirt distal edge 300 can define a shape or footprint that is asymmetric about a midline bisecting the shape or footprint (bisecting either horizontally and/or vertically).

In additional embodiments, the skirt distal edge 300 can be substantially shaped as a polygon with only one pair of congruent sides and/or only one pair of parallel sides.

Figure 5A:
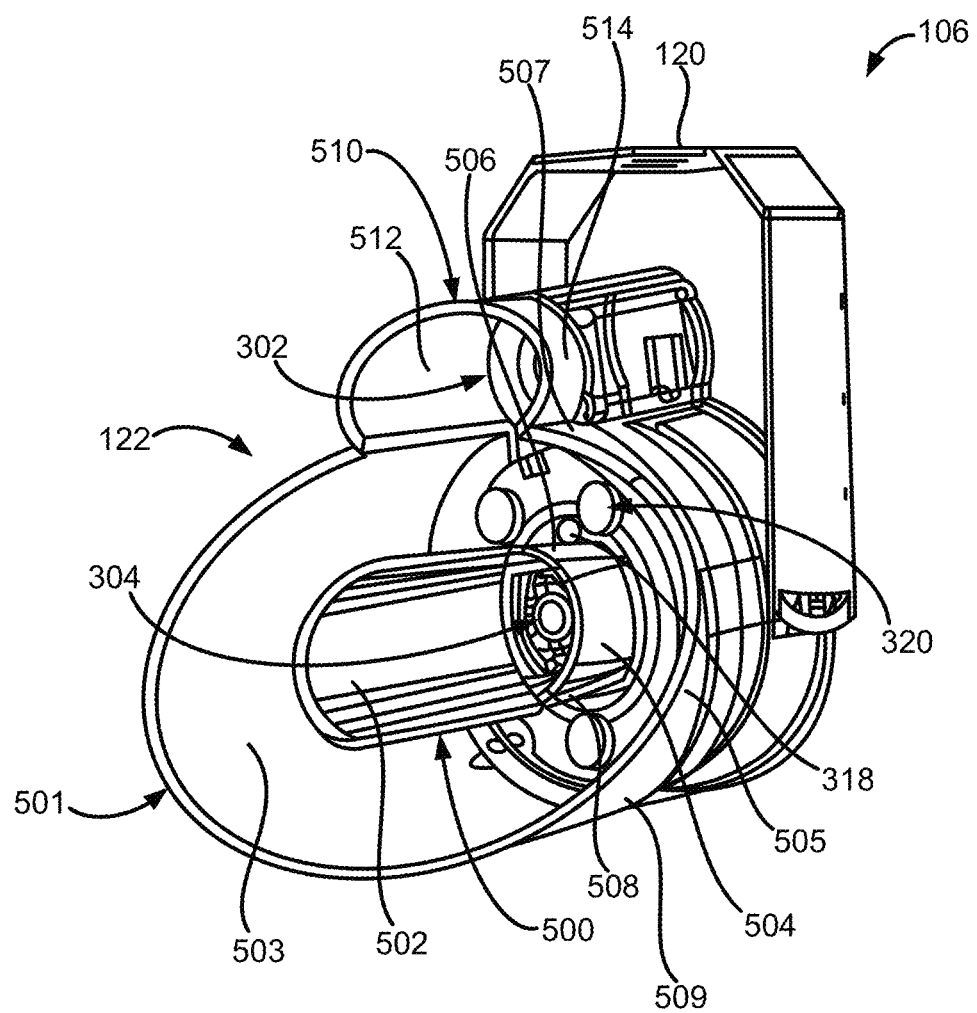
FIG. 5A illustrates another embodiment of an LPR camera assembly.
Figure 9:
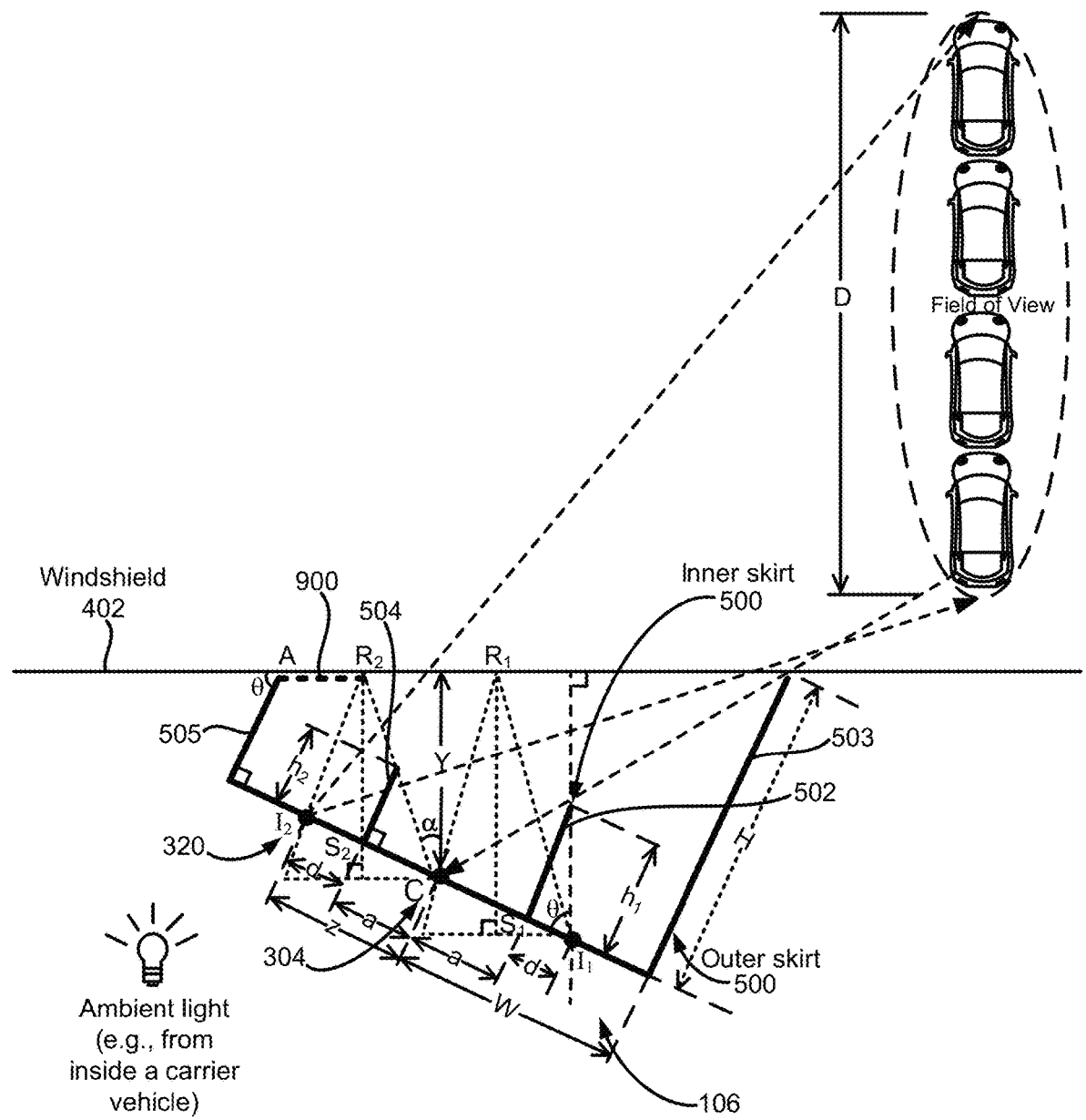
FIG. 9 is a schematic diagram illustrating certain parameters that can be considered in optimizing the lengths or heights of the LPR camera skirts to reduce unwanted IR light reflection and also to ensure that enough IR light is transmitted to illuminate a low-light environment outside of the carrier vehicle.

Although FIGS. 3A to 3D illustrate an embodiment of the LPR camera assembly 106 with only one LPR camera skirt 122, it is contemplated by this disclosure that the LPR camera assembly 106 can comprise an outer LPR camera skirt 501 and an inner LPR camera skirt 500 (see FIGS. 5A and 9). As will be discussed in more detail with respect to FIGS. 5A and 9, the inner LPR camera skirt 500 can block IR light reflected by the windshield 402 of the carrier vehicle 128 that can interfere with the video(s) captured by the nighttime LPR camera 304.

The LPR camera skirt 122 can comprise a first skirt lateral side 310, a second skirt lateral side 312, a skirt upper side 314, and a skirt lower side 316.

The first skirt lateral side 310 can have a first skirt lateral side length 308A or first skirt lateral side height. The second skirt lateral side 312 can have a second skirt lateral side length 308B or a second skirt lateral side height. In some embodiments, the first skirt lateral side length 308A or the first skirt lateral side height can be greater than the second skirt lateral side length 308B or the second skirt lateral side height such that the first skirt lateral side 310 protrudes out further than the second skirt lateral side 312 relative to the LPR cameras 118.

In these and other embodiments, any of the first skirt lateral side length 308A or the first skirt lateral side height or the second skirt lateral side length 308B or the second skirt lateral side height can vary along a width of the first skirt lateral side 310 or along a width of the second skirt lateral side 312, respectively. However, in all such embodiments, a maximum length or height of the first skirt lateral side 310 is greater than a maximum length or height of the second skirt lateral side 312 (see, e.g., FIG. 3B). In further embodiments, a minimum length or height of the first skirt lateral side 310 is greater than a minimum length or height of the second skirt lateral side 312.

The skirt upper side 314 can have a skirt upper side length 308C or a skirt upper side height. The skirt lower side 316 can have a skirt lower side length 308D or a skirt lower side height. In some embodiments, the skirt lower side length 308D or skirt lower side height can be greater than the skirt upper side length 308C or the skirt upper side height such that the skirt lower side 316 protrudes out further than the skirt upper side 314 relative to the LPR cameras 118.

In certain embodiments, any of the skirt upper side length 308C or the skirt lower side length 308D can vary along a width of the skirt upper side 314 or vary along a width of the skirt lower side 316, respectively. However, in all such embodiments, a maximum length/height of the skirt lower side 316 is greater than a maximum length/height of the skirt upper side 314 (see, e.g., FIG. 3B). In further embodiments, a minimum length/height of the skirt lower side 316 is greater than a minimum length/height of the skirt upper side 314.

One technical problem faced by the applicants is how to design an LPR camera skirt that can block or shield an LPR camera from unwanted ambient light but also allow the LPR camera assembly to be positioned at an angle with respect to a windshield of a carrier vehicle. The technical solution discovered and developed by the applicants is the unique design of the LPR camera skirt 122 that can allow the LPR camera assembly 106 to be positioned at an angle with respect to a windshield 402 of the carrier vehicle 128 but still allow the LPR camera skirt 122 to block light emanating from an interior of the carrier vehicle 128 or block light from interfering with the image sensors of the LPR cameras 118.

FIG. 3B also illustrates that the LPR camera assembly 106 can comprise a calibration laser pointer 318. The calibration laser pointer 318 can emit a beam of laser light that can be used to calibrate or facilitate the proper positioning (e.g., pitch and/or swivel) of the LPR camera housing 119. For example, an installer of the LPR camera assembly 106 can use the beam of laser light emitted by the calibration laser pointer 318 to guide the installer in mounting the LPR camera assembly 106 to the ceiling or headliner of the carrier vehicle 128.

The calibration laser pointer 318 can be positioned on a front face or front side of the LPR camera housing 119 near the LPR cameras 118. For example, the calibration laser pointer 318 can be positioned on a front face or front side of the LPR camera housing 119 in between the daytime LPR camera 302 and the nighttime LPR camera 304 and slightly vertically above both camera lenses.

The calibration laser pointer 318 can be at least partially surrounded or shrouded by one of the LPR camera skirts 122 (e.g., at least the outer LPR camera skirt 501).

In some embodiments, the calibration laser pointer 318 can be at least partially surrounded or shrouded by the inner LPR camera skirt 500. In these embodiments, the calibration laser pointer 318 can be positioned close to the nighttime LPR camera 304.

Figure 3D:
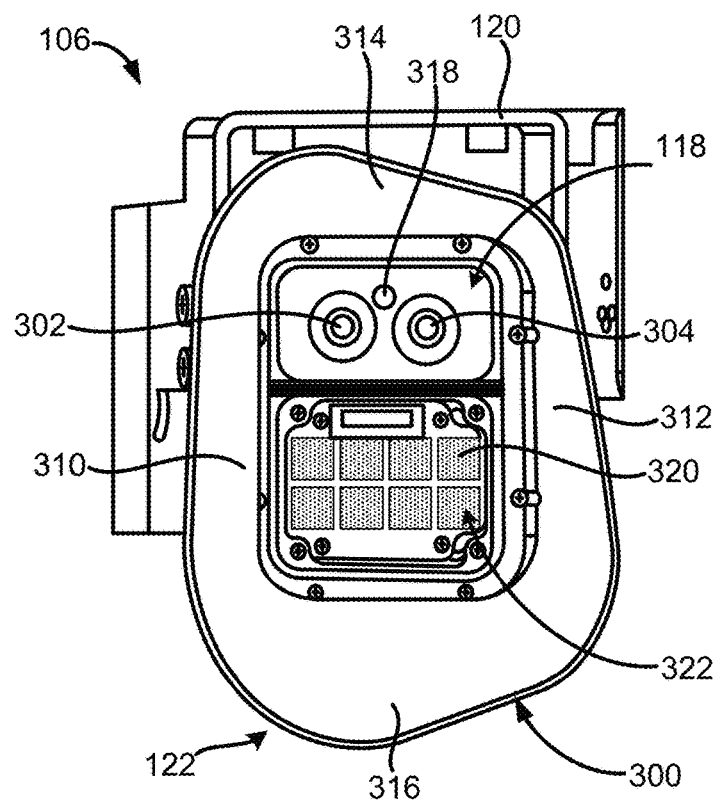
FIG. 3D illustrates a front view of the LPR camera assembly with the IR bandpass filter removed to expose the IR LEDs.

FIG. 3C illustrates a perspective view of part of an LPR camera assembly 106 with the LPR camera mount 120 removed and an IR bandpass filter 306 covering the IR LEDs 320 arranged as an IR light array 322 (see FIG. 3D). FIG. 3D illustrates a front view of the LPR camera assembly 106 with the IR bandpass filter 306 removed to expose the IR LEDs 320 making up the IR light array 322.

As shown in FIG. 3D, the IR light array 322 can comprise 8 IR LEDs 320. For example, the IR light array 322 can be a 2×4 array. In other embodiments, the IR light array 322 can be a 2×3 array, a 2×3 array, a 3×3 array, or a 4×4 array. The size of the IR light array 322 can be adjusted based on the amount of IR light needed to illuminate an external environment for capturing license plates in low-light or nighttime conditions.

Although FIGS. 3A-3D show the LPR camera assembly 106 with only one LPR camera skirt 122, it is contemplated by this disclosure that the LPR camera assembly 106 can also comprise one or more additional LPR camera skirts 122 such as the inner LPR camera skirt 500 (see FIGS. 5A and 9). In embodiments where the LPR camera assembly 106 comprises an inner LPR camera skirt 500, the LPR camera skirt 122 shown in FIGS. 3A-3D can be considered an outer LPR camera skirt 501. In these embodiments, the first skirt lateral side 310 can be considered a first outer camera skirt lateral side, the second skirt lateral side 312 can be considered a second outer camera skirt lateral side, the skirt upper side 314 can be considered an outer skirt upper side, and the skirt lower side 316 can be considered an outer skirt lower side.

Figure 4A:
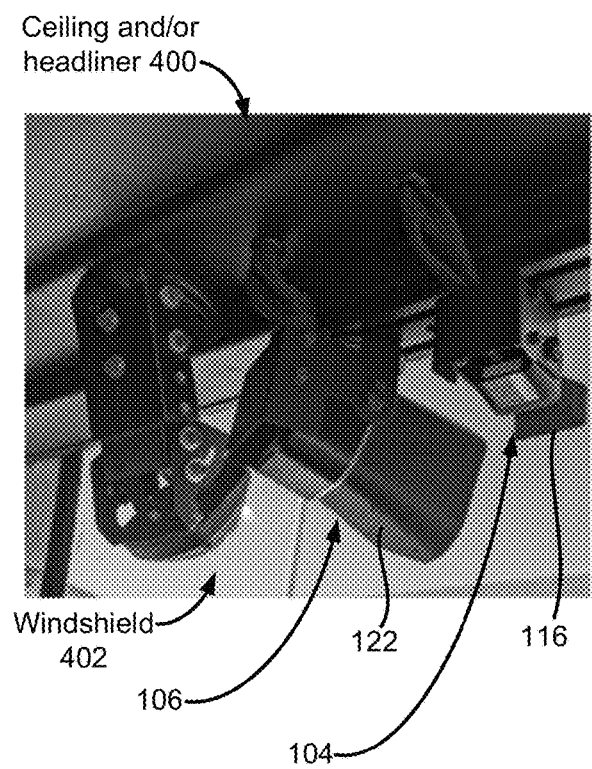
FIGS. 4A and 4B are images showing the context camera assembly and the LPR camera assembly mounted to a ceiling and/or headliner of a carrier vehicle via their respective camera mounts.
Figure 4B:
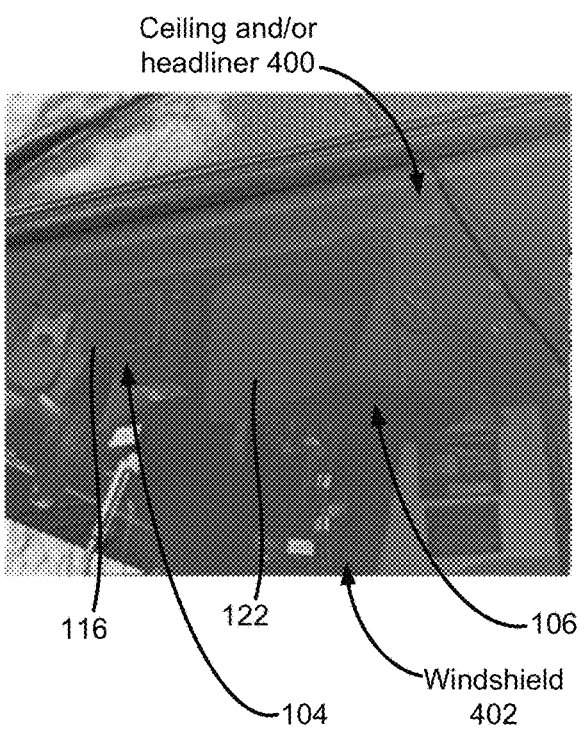

FIGS. 4A and 4B are images showing the context camera assembly 104 and the LPR camera assembly 106 mounted to a ceiling and/or headliner 400 of a carrier vehicle 128 via their respective camera mounts. FIG. 4A illustrates the context camera assembly 104 and the LPR camera assembly 106 mounted to the ceiling and/or headliner 400 of the carrier vehicle 128 from a rear perspective view (from within the carrier vehicle 128) while FIG. 4B illustrates the context camera assembly 104 and the LPR camera assembly 106 mounted to the ceiling and/or headliner 400 of the carrier vehicle 128 from a front perspective view (from outside of the carrier vehicle 128).

In some embodiments, the context camera assembly 104 and the LPR camera assembly 106 can both be mounted above a driver's seat of the carrier vehicle 128. In other embodiments, the context camera assembly 104 and the LPR camera assembly 106 can both be mounted above a passenger's seat of the carrier vehicle 128 (if the carrier vehicle 128 has a passenger's seat). In further embodiments, the context camera assembly 104 and the LPR camera assembly 106 can both be mounted at locations in between the driver's seat and the passenger's seat or in between the driver's seat and a door of the carrier vehicle 128.

FIGS. 4A and 4B also illustrate that the context camera assembly 104 can be mounted facing the windshield 402 of the carrier vehicle 128. For example, the context camera assembly 104 can be mounted such that a distal or front face of a context camera housing 113 is directly facing the front windshield 402 of the carrier vehicle 128 or substantially parallel to the front windshield 402 of the carrier vehicle 128.

FIGS. 4A and 4B also illustrate that the LPR camera assembly 106 can be mounted at an angle with respect to the windshield 402. By mounting the LPR camera assembly 106 in this manner, the LPR cameras 118 can more effectively capture videos and/or images of license plates of vehicles in front of and to one side (e.g., a right side or left side) of the carrier vehicle 128. When the LPR camera assembly 106 is mounted at an angle with respect to the windshield 402, the uneven or incongruent lateral sides of the LPR camera skirt 122 can allow the LPR camera skirt 122 to still block light emanating from within the carrier vehicle 128 and block unwanted light reflected back into the carrier vehicle 128 from the external environment.

FIG. 5A illustrates another embodiment of an LPR camera assembly 106. In this embodiment, the LPR camera assembly 106 can comprise a daytime LPR camera 302 and a nighttime LPR camera 304 (e.g., an IR or NIR camera) surrounded or partially surrounded by a plurality of IR LEDs 320.

The IR LEDs 320 can emit light in the infrared or near-infrared (NIR) range (e.g., about 800 nm to about 1400 nm) and act as an IR or NIR spotlight to illuminate a nighttime environment or low-light environment immediately outside of the carrier vehicle 128. In some embodiments, the IR LEDs 320 can be arranged as a circle or in a pattern surrounding or partially surrounding the nighttime LPR camera 304. In other embodiments, the IR LEDs 320 can be arranged in a rectangular pattern, an oval pattern, and/or a triangular pattern around the nighttime LPR camera 304.

In additional embodiments, the LPR camera assembly 106 can comprise a nighttime LPR camera 304 (e.g., an IR or NIR camera) positioned in between two IR LEDs 320. In these embodiments, one IR LED 320 can be positioned on one lateral side of the nighttime LPR camera 304 and the other IR LED 320 can be positioned on the other lateral side of the nighttime LPR camera 304.

In certain embodiments, the LPR camera assembly 106 can comprise between 3 and 12 IR LEDs 320. In other embodiments, the LPR camera assembly 106 can comprise between 12 and 20 IR LEDs.

FIG. 5A illustrates that the LPR camera assembly 106 can comprise an inner LPR camera skirt 500 and an outer LPR camera skirt 501. In some instances, the inner LPR camera skirt 500 is needed because a considerable amount of IR light is being produced by the IR LEDs 320 or the IR light array 322 and some amount of IR light can be reflected by the windshield 402 of the carrier vehicle 128 back toward the nighttime LPR camera 304. To reduce the amount of interference from such reflected IR light, the nighttime LPR camera 304 can be partially covered or shrouded by the inner LPR camera skirt 500.

In some embodiments, the inner LPR camera skirt 500 can be made of the same material as the outer LPR camera skirt 501. In other embodiments, the inner LPR camera skirt 500 can be made of a material that blocks IR light.

The inner LPR camera skirt 500 can have at least a first inner camera skirt lateral side 502, a second inner camera skirt lateral side 504, an upper inner skirt side 506, and a lower inner skirt side 508. The lengths or heights of the first inner camera skirt lateral side 502, the second inner camera skirt lateral side 504, the upper inner skirt side 506, and the lower inner skirt side 508 can be specifically configured or designed to minimize the amount of reflected IR light that reaches the nighttime LPR camera 304 but also ensure that enough IR light generated by the IR LEDs 320 is transmitted to an external environment to illuminate the external environment in low-light conditions.

The first inner camera skirt lateral side 502 can have a first inner camera skirt lateral side length/height. The second inner camera skirt lateral side 504 can have a second inner camera skirt lateral side length/height. In some embodiments, the first inner camera skirt lateral side length/height can be greater than the second inner camera skirt lateral side length/height such that the first inner camera skirt lateral side 502 protrudes out further than the second inner camera skirt lateral side 504 relative to the nighttime LPR camera 304. In these and other embodiments, any of the first inner camera skirt lateral side length/height or the second inner camera skirt lateral side length/height can vary along a width of the first inner camera skirt lateral side 502 or along a width of the second inner camera skirt lateral side 504, respectively. However, in all such embodiments, a maximum length or height of the first inner camera skirt lateral side 502 is greater than a maximum length or height of the second inner camera skirt lateral side 504. In further embodiments, a minimum length or height of the first inner camera skirt lateral side 502 is greater than a minimum length or height of the second inner camera skirt lateral side 504.

The outer LPR camera skirt 501 can block unwanted ambient light or artificial light emanating from within the carrier vehicle 128 and also block unwanted light reflected from objects (e.g., vehicles, signs, buildings, etc.) outside of the carrier vehicle 128 that can interfere with the nighttime LPR camera 304. The outer LPR camera skirt 501 can have at least a first outer camera skirt lateral side 503, a second outer camera skirt lateral side 505, an upper outer skirt side 507, and a lower outer skirt side 509.

The first outer camera skirt lateral side 503 can have a first outer camera skirt lateral side length/height. The second outer camera skirt lateral side 505 can have a second outer camera skirt lateral side length/height. In some embodiments, the first outer camera skirt lateral side length/height can be greater than the second outer camera skirt lateral side length/height such that the first outer camera skirt lateral side 503 protrudes out further than the second outer camera skirt lateral side 505. In these and other embodiments, any of the first outer camera skirt lateral side length/height or the second outer camera skirt lateral side length/height can vary along a width of the first outer camera skirt lateral side 503 or along a width of the second outer camera skirt lateral side 505, respectively. However, in all such embodiments, a maximum length or height of the first outer camera skirt lateral side 503 is greater than a maximum length or height of the second outer camera skirt lateral side 505. In further embodiments, a minimum length or height of the first outer camera skirt lateral side 503 is greater than a minimum length or height of the second outer camera skirt lateral side 505.

The first inner camera skirt lateral side length/height, the second inner camera skirt lateral side length/height, the first outer camera skirt lateral side length/height, and the second outer camera skirt lateral side length/height will be discussed in more detail with respect to FIG. 9.

As shown in FIG. 5A, the daytime LPR camera 302 can be positioned vertically above the nighttime LPR camera 304. The daytime LPR camera 302 can also be partially covered or shrouded by its own daytime camera skirt 510. The daytime camera skirt 510 can be smaller in size than the LPR camera skirt 122.

The daytime camera skirt 510 can have a first daytime skirt lateral side 512 and a second daytime skirt lateral side 514. The first daytime skirt lateral side 512 can have a first daytime skirt lateral side length/height. The second daytime skirt lateral side 514 can have a second daytime skirt lateral side length/height. In some embodiments, the first daytime skirt lateral side length/height can be greater than the second daytime skirt lateral side length/height such that the first daytime skirt lateral side 512 protrudes out further than the second daytime skirt lateral side 514 relative to the daytime LPR camera 302.

In some embodiments, a maximum length/height of the first daytime skirt lateral side 512 is greater than a maximum length/height of the second daytime skirt lateral side 514. In further embodiments, a minimum length/height of the first daytime skirt lateral side 512 is greater than a minimum length/height of the second daytime skirt lateral side 514.

In certain embodiments, the daytime LPR camera 302 can also be covered by an IR-blocking filter (e.g., polycarbonate) that blocks IR light but allows light in the visible spectrum to pass through.

FIG. 5A also illustrates that the LPR camera assembly 106 can comprise a calibration laser pointer 318. The calibration laser pointer 318 can emit a beam of laser light that can be used to calibrate or facilitate the proper positioning (e.g., pitch and/or swivel) of the LPR camera housing 119. For example, an installer of the LPR camera assembly 106 can use the beam of laser light emitted by the calibration laser pointer 318 to guide the installer in mounting the LPR camera assembly 106 to the ceiling or headliner 400 of the carrier vehicle 128.

Figure 5B:
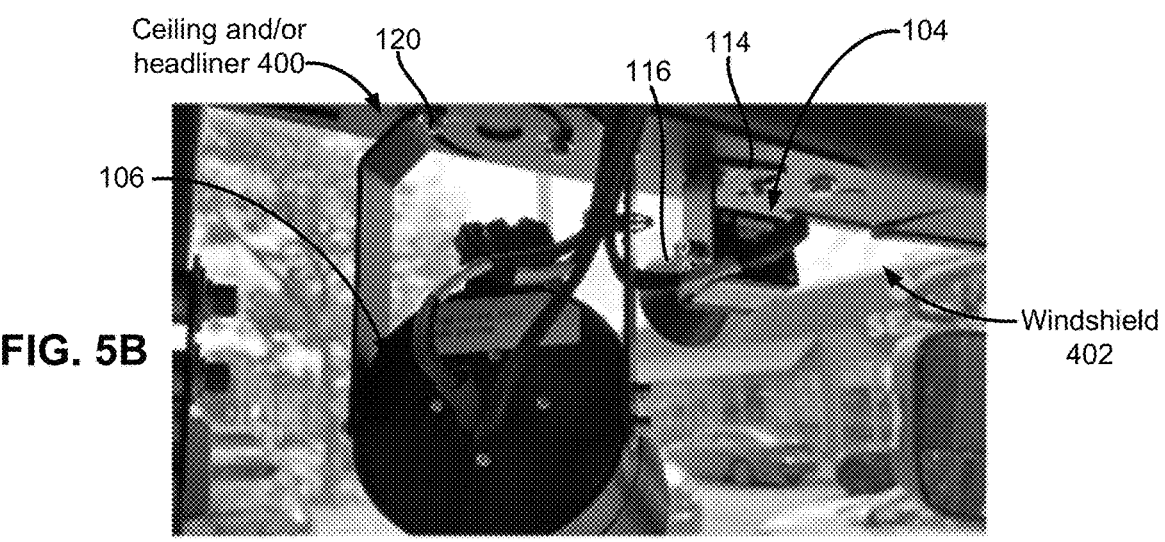
FIGS. 5B and 5C are images showing the LPR camera assembly of FIG. 5A mounted to a ceiling and/or headliner of a carrier vehicle and another embodiment of the context camera assembly mounted next to the LPR camera assembly.
Figure 5C:
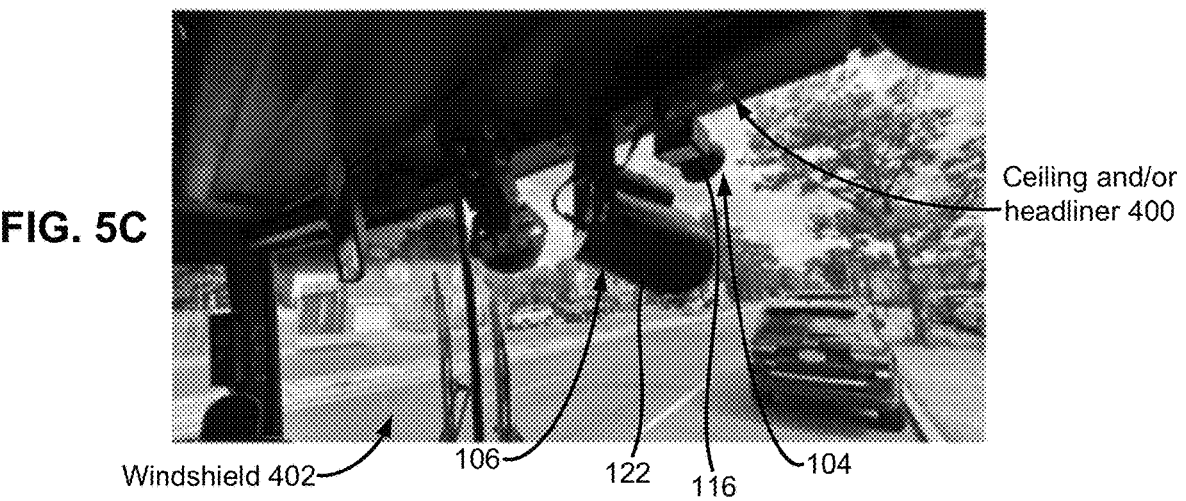

FIGS. 5B and 5C are images showing the LPR camera assembly 106 of FIG. 5A mounted to a ceiling and/or headliner 400 of a carrier vehicle 128 and another embodiment of the context camera assembly 104 mounted next to the LPR camera assembly 106. As shown in FIGS. 5B and 5C, the LPR camera assembly 106 can be mounted at an angle with respect to the windshield. The uneven or incongruent lateral sides of the outer LPR camera skirt 501 can allow the outer LPR camera skirt 501 to block unwanted ambient light or artificial light emanating from within the carrier vehicle 128 and block unwanted light reflected from objects (e.g., vehicles, signs, buildings, etc.) outside of the carrier vehicle 128 that can interfere with the nighttime LPR camera 304.

FIGS. 5B and 5C also illustrate that the context camera assembly 104 can be mounted such that the context camera 112 directly faces the front windshield 402 of the carrier vehicle 128. For example, the context camera assembly 104 can be mounted such that a distal or front face of the context camera housing 113 is substantially parallel to the windshield 402 of the carrier vehicle 128.

As shown in FIGS. 5B and 5C, the context camera skirt 116 can be substantially conical-shaped or shaped as a frustoconic. When the context camera skirt 116 is shaped as a frustoconic, the length or height of the context camera skirt 116 can be the same all around (same circumferentially).

The cameras of the system 100 can be mounted at various locations or positions behind the windshield 402 of the carrier vehicle 128. The cameras of the system 100 can be mounted at any locations or positions that do not block or obstruct the view of the driver of the carrier vehicle 128.

As shown in FIGS. 4A, 4B, 5B, and 5C, the camera mounts (the context camera mount 114 and/or the LPR camera mount 120) can be coupled to a ceiling or headliner 400 of the carrier vehicle 128 and the cameras of the system 100 (the context camera 112 and/or the LPR cameras 118) can be positioned behind the windshield 402 near the top of the windshield 402.

In other embodiments, the camera mounts (the context camera mount 114 and/or the LPR camera mount 120) can be coupled to a dashboard or console of the carrier vehicle 128 and the cameras of the system 100 (the context camera 112 and/or the LPR cameras 118) can be positioned behind the windshield 402 near the bottom of the windshield 402.

Figure 6:
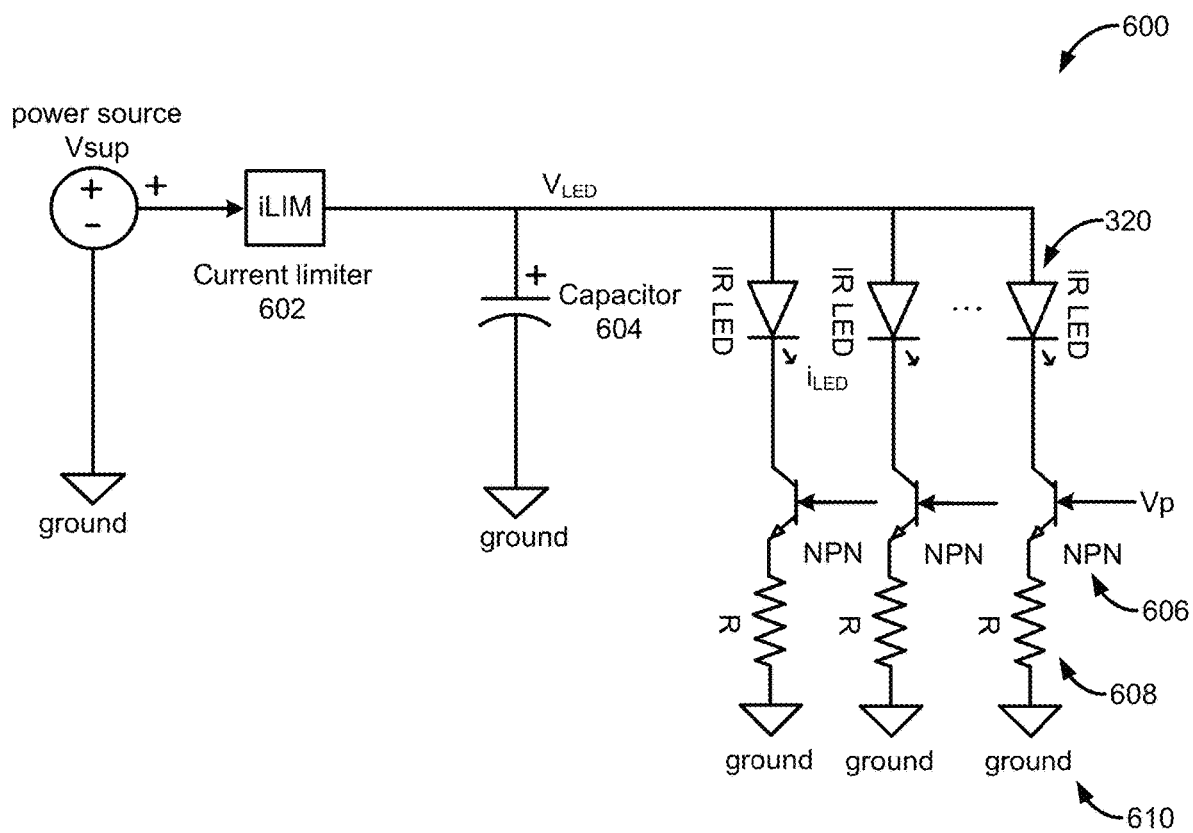
FIG. 6 is a schematic circuit diagram illustrating a way to synchronize the emission of IR light from the IR LEDs with the rate of camera exposure of the nighttime LPR camera of the LPR camera assembly.

FIG. 6 is a schematic circuit diagram illustrating a control circuit 600 configured to synchronize the emission of IR light from the IR LEDs 320 with the camera exposure rate of the nighttime LPR camera 304 of the LPR camera assembly 106. In some embodiments, the nighttime LPR camera 304 can be a camera configured to capture videos in the IR or near-infrared (NIR) spectrum.

As previously discussed, one technical problem faced by the applicants is that the IR LEDs 320 generate a large amount of heat. When the IR LEDs 320 are turned on for an extended period of time, the lifespan of such IR LEDs 320 is significantly reduced and the heat generated by such IR LEDs 320 can damage or interfere with the surrounding electronic equipment. One technical solution discovered and developed by the applicant is the control circuit 600 disclosed herein that synchronizes the emission of IR light from the IR LEDs 320 with the camera exposure rate and periodically turns off the IR LEDs 320 to prevent such LEDs from overheating and extending the lifespan of such LEDs.

The control circuit 600 can comprise a current limiter 602, an energy storage capacitor 604, and at least one bipolar junction transistor 606 connected in series between one of the IR LEDs 320 and a resistor 608.

The current limiter 602 can be configured to limit a charging current delivered to the capacitor 604 as shown in FIG. 6. In some embodiments, the current limiter 602 can be set to the average pulse power over the frame rate. The IR LEDs 320 can be connected in parallel with the capacitor 604.

The capacitor 604 can be configured to discharge in response to the arrival of a camera frame capture pulse (Vp). The camera frame capture pulse (Vp) can be timed to arrive in accordance with a camera frame rate of the nighttime LPR camera 304.

Current can flow through the IR LEDs 320 to illuminate the IR LEDs 320 in response to the capacitor 604 being discharged. As shown in FIG. 6, the current can flow through the IR LEDs 320 and the resistors 608 into a current sink 610.

Once the camera frame capture pulse (Vp) passes, the bipolar junction transistors 606 can be disconnected and the IR LEDs 320 can be turned off in response. At this point, the capacitor 604 can begin to recharge. The capacitor 604 will discharge again once the next camera frame capture pulse (Vp) arrives. When designed in this manner, the control circuit 600 can turn off the IR LEDs 320 until the arrival of a subsequent camera fame capture pulse (Vp).

In some embodiments, the bipolar junction transistors 606 can be NPN transistors. In other embodiments, the bipolar junction transistors 606 can be other types of bipolar transistors.

The following equations (Equations 1 and 2) can be used to compute the resistance parameter of the resistors 608:

$$i_{LED} = (V_P - V_{BE})/R \qquad \text{[Equation 1]}$$

$$\text{thus, } R = (V_P - V_{BE})/i_{LED} \qquad \text{[Equation 2]}$$

For example, the amplitude of the camera signal pulse or the camera frame capture pulse can be 2 V ($V_p = 2$ V).

Moreover, $V_{BE}$ can be the base-emitter voltage of the bipolar junction transistor 606 (e.g., the NPN transistor). The emitter current is related to $V_{BE}$ exponentially. At room temperature, an increase in $V_{BE}$ by approximately 60 mV increases the emitter current by a factor of 10.

For example, when $V_{BE} = 0.7$ V and the current required to trigger the IR LED 320 is 5 Amps, we can compute R using Equation 2 above:

$$R = (2 \text{ V} - 0.7 \text{ V})/5 \text{ Amps} = 0.26 \Omega$$

Moreover, the following equation (Equation 3) can be used to calculate the capacitance of the capacitor 604:

$$C = i_{LIM} \times dt/dV \qquad \text{[Equation 3]}$$

where dt is the time required to charge the capacitor to $V_{SUP}$, $$\text{and } dV = V_{SUP} - V_{LED} \qquad \text{[Equation 4]}$$

As a more specific example, if the camera frame rate is 20 frames per second (FPS), the leading edge of $V_P$ comes every 50 milliseconds (ms) and the pulse width is 1 ms. After that, the capacitor needs to be charged within the next 49 ms.

As a result, dt=49−y, where y is the time between the completion of the charging and the arrival of the next camera frame capture pulse ($V_p$). As an example, if the charging is completed in 40 ms, that leaves y as 9 ms.

Figure 7:
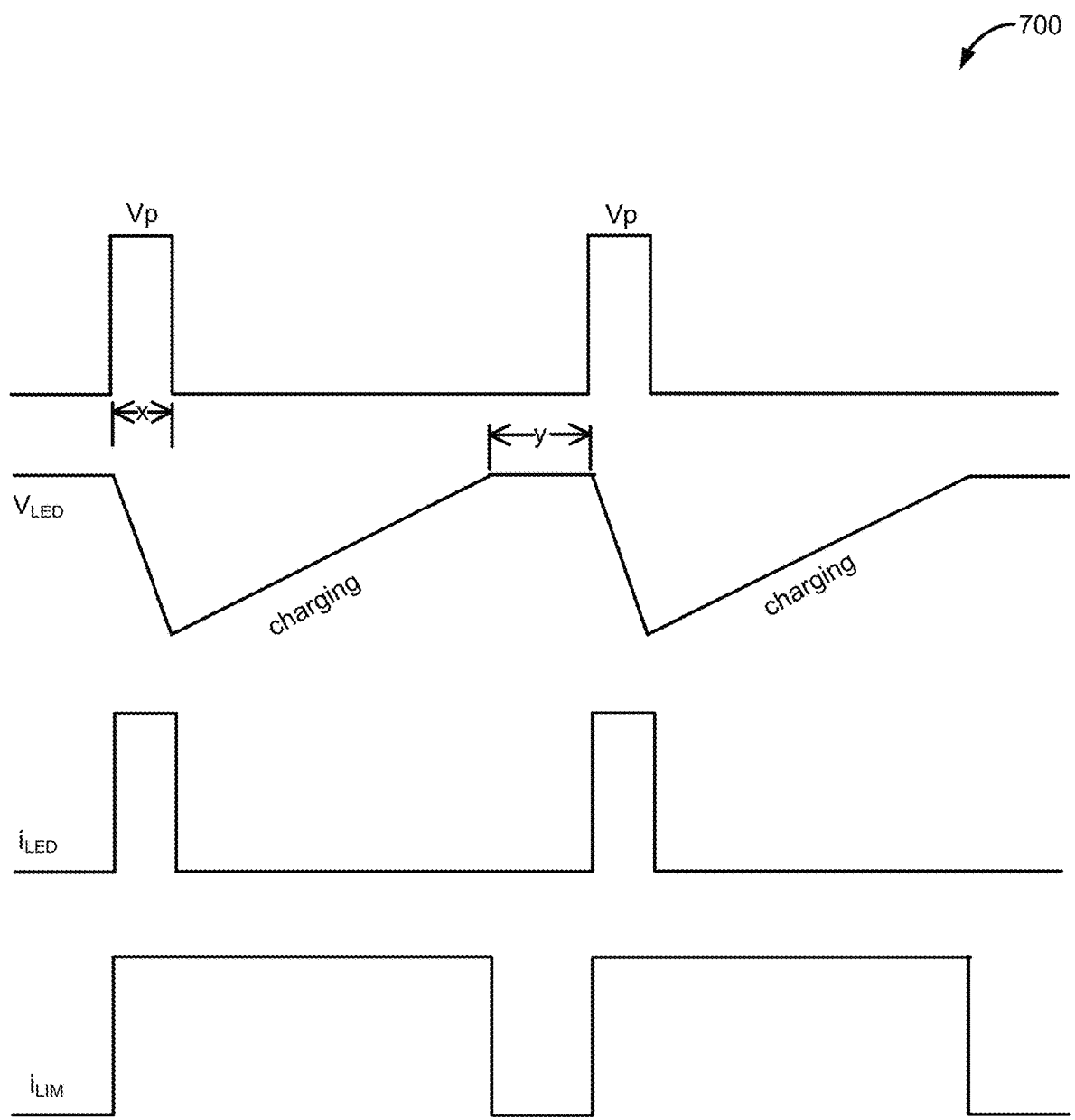
FIG. 7 is a circuit timing diagram showing current flowing through the IR LEDs in synch with the arrival of a camera frame capture pulse or camera signal pulse.

FIG. 7 is a circuit timing diagram 700 showing current flowing through the IR LEDs 320 in synch with the arrival of the camera frame capture pulse or the camera signal pulse (Vp). As previously discussed, current can flow to the IR LEDs 320 when the capacitor 604 is discharged. Since the discharge happens during the 1 ms pulse width span (x) as shown in FIG. 7, the capacitor 604 can charge during the 49 ms period before the arrival of the next camera frame capture pulse or the camera signal pulse (Vp).

Also, the IR LEDs 320 can require approximately 10 microseconds (μs) to be turned on after the arrival of the camera frame capture pulse (Vp). This leaves approximately 990 μs of time for the IR LEDs to illuminate a scene (e.g., illuminate license plate(s) of vehicles involved in a traffic violation event) that can be captured by one exposure period of the nighttime LPR camera 304 (e.g., the IR or NIR camera).

Figure 8:
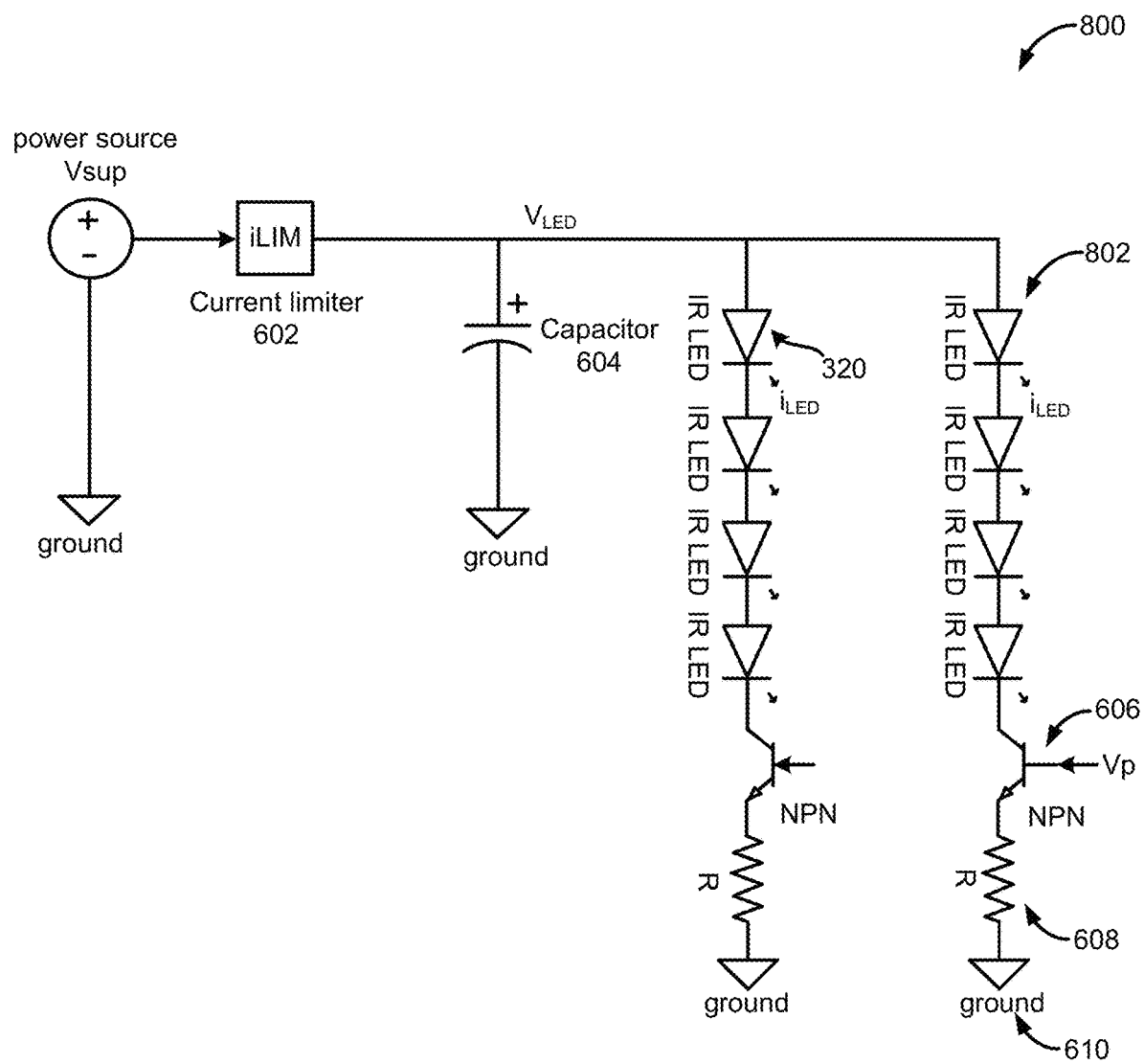
FIG. 8 is a schematic circuit diagram illustrating an alternative circuit design that handles IR LED failures in an alternative manner.

FIG. 8 is a schematic circuit diagram illustrating an alternative control circuit 800 configured to synchronize the emission of IR light from the IR LEDs 320 with the camera exposure rate or of the nighttime LPR camera 304 of the LPR camera assembly 106. The control circuit 800 is differentiated from the control circuit 600 shown in FIG. 6 in that it handles IR LED failures in a different manner.

The control circuit 800 can comprise a current limiter 602, an energy storage capacitor 604, at least two strings 802 of IR LEDs 320, and at least one bipolar junction transistor 606 connected in series between one of the strings 802 and a resistor 608. Each of the strings 802 can comprise multiple (e.g., three, four, or five) IR LEDs 320 connected in series.

The current limiter 602 can be configured to limit a charging current delivered to the capacitor 604 as shown in FIG. 8. In some embodiments, the current limiter 602 can be set to the average pulse power over the frame rate. Each string 802 of IR LEDs 320 can be connected in parallel with the capacitor 604.

Similar to the circuitry shown in FIG. 6, the discharge of the capacitor 604 (and emission of IR light from the IR LEDs 320) is synchronized with the rate of camera exposure of the nighttime LPR camera 304 (e.g., the IR camera) of the LPR camera assembly 106.

However, in the design shown in FIG. 8, when one of the IR LEDs 320 in one of the strings 802 of IR LEDs 320 fails, another string 802 of IR LEDs 320 is triggered such that current flows to the IR LEDs 320 in the other string 802 of IR LEDs 320.

FIG. 9 is a schematic diagram illustrating certain parameters that can be considered in optimizing the lengths/heights of the LPR camera skirts 122 (e.g., the inner LPR camera skirt 500 and the outer LPR camera skirt 501) to reduce unwanted IR light reflection but also to ensure that enough IR light is transmitted to illuminate a low-light environment outside of the carrier vehicle 128. FIG. 9 is a simplified representation of a top-down transverse cross-sectional view of the relevant parts of the LPR camera assembly 106 positioned at an angle with respect to the windshield 402 of the carrier vehicle 128.

As shown in FIG. 9, the LPR camera assembly 106 can comprise an inner LPR camera skirt 500 and an outer LPR camera skirt 501. The inner LPR camera skirt 500 can be at least partially shrouded, surrounded, or otherwise encompassed by the outer LPR camera skirt 501.

The inner LPR camera skirt 500 can comprise a first inner camera skirt lateral side 502 and a second inner camera skirt lateral side 504. The outer LPR camera skirt 501 can comprise a first outer camera skirt lateral side 503 and a second outer camera skirt lateral side 505.

As previously discussed, the design of the inner LPR camera skirt 500 needs to be optimized such that the inner LPR camera skirt 500 blocks IR light reflected from the windshield 402 of the carrier vehicle 128 but does not block IR light emitted by the IR LEDs 320 to illuminate an event scene. Moreover, the design of the outer LPR camera skirt 501 also needs to be optimized to allow the outer LPR camera skirt 501 to effectively block unwanted ambient light emanating from within the interior of the carrier vehicle 128 and block unwanted light reflected from objects outside of the carrier vehicle 128.

In the simplified representation shown in FIG. 9, the LPR camera assembly 106 can comprise a nighttime LPR camera 304 (e.g., an IR camera, labeled as C in FIG. 9) positioned in between two IR LEDs 320 (labeled as $I_1$ and $I_2$ in FIG. 9). For example, a first IR LED 320 ($I_1$) can be positioned on one lateral side of the nighttime LPR camera 304 and a second IR LED 320 ($I_2$) can be positioned on the other lateral side of the nighttime LPR camera 304.

As shown in FIG. 9, the first inner camera skirt lateral side 502 can be positioned in between the first IR LED 320 ($I_1$) and the nighttime LPR camera 304 and the second inner camera skirt lateral side 504 can be positioned in between the second IR LED 320 ($I_2$) and the nighttime LPR camera 304.

As shown in FIG. 9 (and also shown in FIGS. 4A, 4B, 5B, and 5C), the LPR camera assembly 106 can be oriented or positioned such that the LPR camera assembly 106 (including the inner LPR camera skirt 500, the outer LPR camera skirt 501, the IR LEDs 320, and the nighttime LPR camera 304) is angled with respect to the windshield 402 of the carrier vehicle 128. Angling the LPR camera assembly 106 can allow the nighttime LPR camera 304 to more effectively capture videos of vehicles parked or in motion on one side (e.g., a right side or left side) of the carrier vehicle 128. However, one technical problem faced by the applicants is that the windshield 402 of carrier vehicles 128 used to transport the LPR camera assembly 106 often reflected IR light emitted IR LEDs 320 back toward the nighttime LPR camera 304, thereby affecting the quality of videos captured by the nighttime LPR camera 304. One technical solution discovered and developed by the applicants is to angle the LPR camera assembly 106 and also shroud or at least partially surround the nighttime LPR camera 304 with an inner LPR camera skirt 500 where the lateral sides of the inner LPR camera skirt 500 are optimized to allow the IR LEDs 320 to illuminate an event scene outside of the carrier vehicle 128 in low-light conditions but also block IR light reflected by the windshield 402 of the carrier vehicle 128 back toward the camera.

Although FIG. 9 shows the distal or terminal ends of the first outer camera skirt lateral side 503 and the second outer camera skirt lateral side 505 (i.e., the distal skirt edge) appearing to physically contact or touch the windshield 402, it is contemplated by this disclosure that the distal or terminal ends of the first outer camera skirt lateral side 503 and the second outer camera skirt lateral side 505 (i.e., the distal skirt edge) is positioned close to (e.g., between approximately 1.0 cm and 3.0 cm from) the windshield 402 but does not physically contact or touch the windshield 402.

The length or height of the lateral sides of the inner LPR camera skirt 500 can be determined based on several parameters and constraints. For purposes of this disclosure, the height of a camera skirt (any of the LPR camera skirts 122 or context camera skirt 116) is the same as the length of the camera skirt and is used to denote the extent to which a lateral side of the camera skirt extends out from a distal face or side of the LPR camera housing 119.

For example, the length or height of the lateral sides of the inner LPR camera skirt 500 can be determined based on certain combinations of the following parameters: an (i) angle ($\theta$) made by at least one of the lateral sides of the inner LPR camera skirt 500 and the windshield 402, a (ii) length or height of one of the lateral sides of the outer LPR camera skirt 501, a (iii) distance separating the nighttime LPR camera 304 and the lateral sides of the outer LPR camera skirt 501, a (iv) distance separating each of the IR LEDs 320 and the lateral sides of the inner LPR camera skirt 500, a (v) distance separating the nighttime LPR camera 304 and one of the lateral sides of the inner LPR camera skirt 500, and a (vi) distance separating the nighttime LPR camera 304 and the windshield 402 in a direction orthogonal to the windshield 402.

Moreover, the length or height of the lateral sides of the inner LPR camera skirt 500 can be determined based on the following two constraints: 1) the length or height of the lateral side of the inner LPR camera skirt 500 should not block any incoming IR light rays to the nighttime LPR camera 304 (e.g., the IR camera), and 2) the length or height of the lateral side of the inner LPR camera skirt 500 should block IR light rays that are reflected back to the nighttime LPR camera 304 (e.g., the IR camera) by the windshield 402.

For example, the length or height ($h_1$) of the first inner camera skirt lateral side 502 can be determined based on the angle ($\theta$) made by the second outer camera skirt lateral side 505 and the windshield 402 and the distance (d) separating either the first IR LED 320 ($I_1$) and the first inner camera skirt lateral side 502 or the second IR LED 320 ($I_2$) and the second inner camera skirt lateral side 504.

Also, for example, the length or height ($h_1$) of the first inner camera skirt lateral side 502 can be determined based on a length or height (H) of the first outer camera skirt lateral side 503, a distance (W) separating the nighttime LPR camera 304 (shown as "C" in FIG. 9) and the first outer camera skirt lateral side 503, and the distance (a) separating the nighttime LPR camera 304 and one of the lateral sides of the inner LPR camera skirt 500 (either the first inner camera skirt lateral side 502 or the second inner camera skirt lateral side 504).

The below equation (Equation 5) can be used to calculate the length or height ($h_1$) of the first inner camera skirt lateral side 502:

$$h_1 \leq \min(d \times \tan\theta, a \times H/W) \quad \text{[Equation 5]}$$

The length or height ($h_2$) of the second inner camera skirt lateral side 504 can be determined by considering the second constraint that the length or height should be sufficient to block IR light rays reflected by the windshield 402 which emanated from the second IR LED 320 ($I_2$). As shown in FIG. 9, $R_2$ is the point where IR light rays emanating from the second IR LED 320 ($I_2$) strike the windshield 402.

The length or height ($h_2$) of the second inner camera skirt lateral side 504 can be determined based on the angle ($\theta$) made by the second outer camera skirt lateral side 505 and the windshield 402, the distance (d) separating either the first IR LED 320 ($I_1$) and the first inner camera skirt lateral side 502 or the second IR LED 320 ($I_2$) and the second inner camera skirt lateral side 504, the distance (a) separating the nighttime LPR camera 304 and one of the lateral sides of the inner LPR camera skirt 500 (either the first inner camera skirt lateral side 502 or the second inner camera skirt lateral side 504), and the distance (Y) separating the nighttime LPR camera 304 and the windshield 402 in a direction orthogonal to the windshield 402.

For example, the length or height ($h_2$) of the second inner camera skirt lateral side 504 can first be determined by calculating angle $\alpha$. Angle $\alpha$ can be calculated using Equation 6 below:

$$\alpha = \arctan\frac{\sin\theta}{2Y/(a+d) - \cos\theta}, \quad \text{[Equation 6]}$$

Thus, the length or height ($h_2$) of the second inner camera skirt lateral side 504 can be calculated using Equation 7 below:

$$h_2 = a \times \tan(\theta - \alpha) \quad \text{[Equation 7]}$$

However, since $h_2$ calculated from the above equation can also block IR light rays emitted by the second IR LED 320 ($I_2$), this can result in a situation where the IR light is insufficient to illuminate the event scene. So, the length or height ($h_2$) of the second inner camera skirt lateral side 504 can be reduced to allow enough IR light rays to pass through. In this case, the length or height ($h_2$) of the second inner camera skirt lateral side 504 can be calculated using Equation 8 below:

$$h_2 = \frac{d \times H}{a + d + W} \quad \text{[Equation 8]}$$

In some embodiments, the second outer camera skirt lateral side 505 of the outer LPR camera skirt 501 can be extended parallel to the surface of the windshield 402 from point A to $R_2$ (shown in dark broken lines in FIG. 9). As shown in FIG. 9, this extra segment 900 of the second outer camera skirt lateral side 505 (from point A to $R_2$) can block reflections from point $R_2$. The length of this extra segment 900 can be equal to the distance between A and $R_2$, which can be computed as (W−a−d)/sin $\theta$.

In all of the embodiments discussed above, the length or height of the first inner camera skirt lateral side 502 is greater than the length or height of the second inner camera skirt lateral side 504. Moreover, the length or height of the first outer camera skirt lateral side 503 is greater than the length or height of the second outer camera skirt lateral side 505. Furthermore, the length or height of the first inner camera skirt lateral side 502 is less than the length or height of the first outer camera skirt lateral side 503.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element.

As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A perception system for detecting a traffic violation, comprising:

a context camera assembly, comprising:

a context camera housing containing a context camera configured to capture videos of a traffic violation event, a context camera mount coupled to the context camera housing and configured to mount the context camera housing to an interior of a carrier vehicle, and a context camera skirt coupled to and protruding outwardly from the context camera housing, wherein the context camera skirt is configured to block unwanted ambient light;

a license plate recognition (LPR) camera assembly, comprising:

an LPR camera housing containing one or more LPR cameras configured to capture videos containing one or more license plates of one or more vehicles involved in the traffic violation event, an LPR camera mount coupled to the LPR camera housing and configured to mount the LPR camera housing to the interior of the carrier vehicle at an angle, laterally, with respect to a windshield of the carrier vehicle, and at least one LPR camera skirt coupled to and protruding outwardly from the LPR camera housing, wherein the at least one LPR camera skirt comprises a first camera skirt lateral side and a second camera skirt lateral side, wherein a length of the first camera skirt lateral side is not the same as the length of the second camera skirt lateral side, wherein the at least one LPR camera skirt is configured to block unwanted light; and a control unit communicatively coupled to the context camera and the one or more LPR cameras and configured to receive videos captured by at least one of the context camera and the one or more LPR cameras and transmit the videos wirelessly to another device.

2. The perception system of claim 1, wherein the LPR camera assembly further comprises a daytime LPR camera and a nighttime LPR camera.

3. The perception system of claim 2, wherein the nighttime LPR camera is an infrared (IR) camera.

4. The perception system of claim 2, wherein the LPR camera assembly further comprises a plurality of infrared (IR) lights to illuminate an event scene.

5. The perception system of claim 4, wherein the plurality of IR lights are arranged to surround or partially surround the nighttime LPR camera.

6. The perception system of claim 4, wherein the plurality of IR lights are configured to be arranged as an IR light array.

7. The perception system of claim 4, wherein emission of IR light by the plurality of IR lights is synchronized with a rate with which the nighttime LPR camera captures video frames or images.

8. The perception system of claim 7, wherein the plurality of IR lights are periodically powered off to avoid overheating, wherein the powering off of the plurality IR lights is controlled by a control circuit comprising a current limiter, a capacitor, and at least one bipolar junction transistor.

9. A license plate recognition (LPR) camera assembly, comprising:

an LPR camera housing containing one or more LPR cameras configured to capture videos containing one or more license plates of one or more vehicles involved in a traffic violation event;

an LPR camera mount coupled to the LPR camera housing and configured to mount the LPR camera housing to an interior of a carrier vehicle at an angle, laterally, with respect to a windshield of the carrier vehicle;

a plurality of infrared (IR) lights configured to illuminate an event scene of the traffic violation event; and at least one LPR camera skirt coupled to and protruding outwardly from the LPR camera housing, wherein the at least one LPR camera skirt comprises a first camera skirt lateral side and a second camera skirt lateral side, wherein a length of the first camera skirt lateral side is not the same as the length of the second camera skirt lateral side, wherein the at least one LPR camera skirt is configured to prevent unwanted light from interfering with the videos captured by the one or more LPR cameras.

10. The LPR camera assembly of claim 9, wherein the one or more LPR cameras comprises a daytime LPR camera configured to capture videos in a visible spectrum and a nighttime LPR camera configured to capture videos in an IR spectrum.

11. The LPR camera assembly of claim 9, wherein the plurality of IR lights are arranged in an array.

12. The LPR camera assembly of claim 9, wherein the plurality of IR lights are arranged to surround or partially surround at least one of the LPR cameras.

13. The LPR camera assembly of claim 9, wherein the at least one LPR camera skirt comprises an outer LPR camera skirt and an inner LPR camera skirt at least partially shrouded or surrounded by the outer LPR camera skirt.

14. The LPR camera assembly of claim 13, wherein the outer LPR camera skirt comprises a first outer camera skirt lateral side and a second outer camera skirt lateral side, and wherein a length of the first outer camera skirt lateral side is greater than the length of the second outer camera skirt lateral side.

15. The LPR camera assembly of claim 14, wherein the inner LPR camera skirt comprises a first inner camera skirt lateral side and a second inner camera skirt lateral side, and wherein a length of the first inner camera skirt lateral side is greater than the length of the second inner camera skirt lateral side.

16. The LPR camera assembly of claim 15, wherein the length of the first inner camera skirt lateral side is less than the length of the first outer camera skirt lateral side.

17. The LPR camera assembly of claim 9, further comprising an IR bandpass filter covering the plurality of IR lights.

* * * * *